United States Patent
Okutomi

(10) Patent No.: US 7,174,019 B2
(45) Date of Patent: Feb. 6, 2007

(54) CIPHER GENERATING DEVICE, CIPHER DECODING DEVICE, CIPHER GENERATING PROGRAM, CIPHER DECODING PROGRAM, AUTHENTICATION SYSTEM AND ELECTRONIC DEVICE

(75) Inventor: Hidetoshi Okutomi, Kawasaki (JP)

(73) Assignee: Toshiba Information Systems (Japan) Corporation, Kawasaki (JP)

( * ) Notice: Subject to any disclaimer, the term of this patent is extended or adjusted under 35 U.S.C. 154(b) by 810 days.

(21) Appl. No.: 10/290,203

(22) Filed: Nov. 8, 2002

(65) Prior Publication Data

US 2003/0091190 A1    May 15, 2003

(30) Foreign Application Priority Data

Nov. 12, 2001    (JP) .............................. 2001-346658

(51) Int. Cl.
*H04L 9/28* (2006.01)
*H04L 9/00* (2006.01)
*H04L 1/00* (2006.01)

(52) U.S. Cl. ...................... 380/263; 380/28; 380/282; 380/44

(58) Field of Classification Search ................ 380/263, 380/44, 28
See application file for complete search history.

(56) References Cited

U.S. PATENT DOCUMENTS

| 5,048,086 | A | * | 9/1991 | Bianco et al. ................. 380/28 |
| 5,479,513 | A | * | 12/1995 | Protopopescu et al. ....... 380/28 |
| 5,696,826 | A | * | 12/1997 | Gao ............................ 380/28 |
| 5,751,811 | A | | 5/1998 | Magnotti et al. |
| 6,014,445 | A | | 1/2000 | Kohda et al. |
| 6,064,738 | A | * | 5/2000 | Fridrich ........................ 380/28 |
| 6,587,563 | B1 | * | 7/2003 | Crandall ...................... 380/263 |
| 6,792,111 | B1 | * | 9/2004 | Italia et al. ................. 380/263 |
| 2002/0116637 | A1 | * | 8/2002 | Deitsch et al. .............. 713/201 |

FOREIGN PATENT DOCUMENTS

JP    2001-285277    10/2001

* cited by examiner

*Primary Examiner*—Ayaz Sheikh
*Assistant Examiner*—Arezoo Sherkat
(74) *Attorney, Agent, or Firm*—Finnegan, Henderson, Farabow, Garrett & Dunner, L.L.P.

(57) ABSTRACT

Encryption, having sufficient concealment, is carried out through chaotic computation using integer arithmetic. There is provided a cipher generating device, for carrying out computation, for plain text information, to apply chaotic noise obtained using a mapping function for generating chaotic noise based on encrypted key data, to generate a cipher. This cipher generation device comprises parameter generation means 102 for generating a parameter string for use in chaotic computation based on the key data, chaotic noise generating means 103 for carrying out chaotic computation using the parameter string generated by the parameter generating means 102 and obtaining the chaotic noise, and scheduling means 104 for carrying out scheduling of the parameter string so as to cause a change in the parameter string every fixed cycle the parameter string is used in the chaotic computation.

8 Claims, 16 Drawing Sheets

F I G. 13
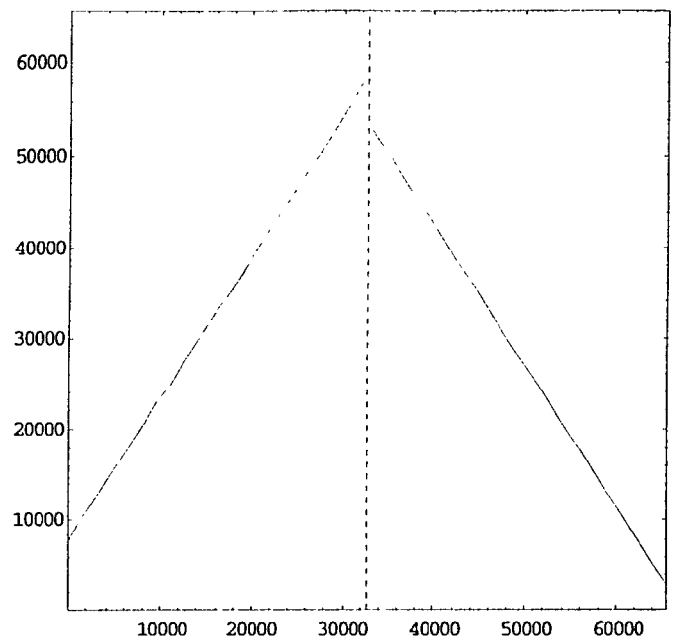
F I G. 14
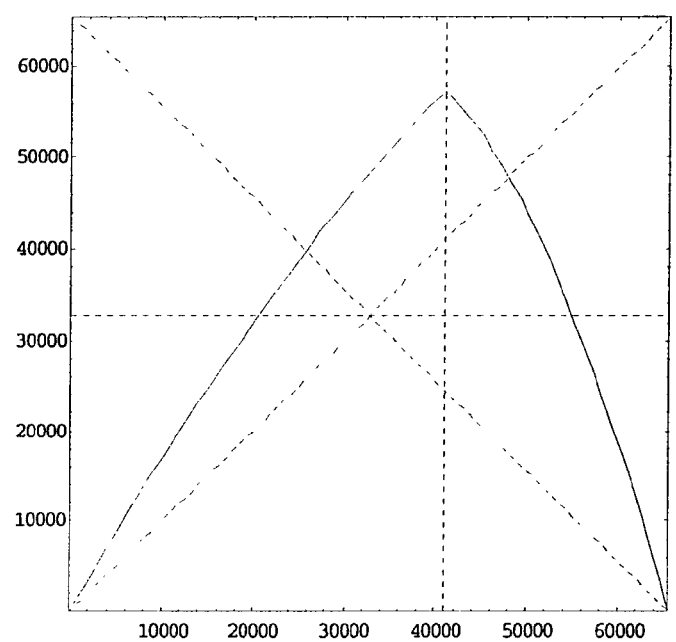

CIPHER GENERATING DEVICE, CIPHER DECODING DEVICE, CIPHER GENERATING PROGRAM, CIPHER DECODING PROGRAM, AUTHENTICATION SYSTEM AND ELECTRONIC DEVICE

BACKGROUND OF THE INVENTION

1. Technical Field

The present invention relates to a cipher generating device for generating a cipher through computation in accordance with chaotic computation, a cipher decoding device for carrying out decoding through a reverse process, an cipher generating program used in this cipher generating device, a cipher decoding program used in the cipher decoding device, and an authentication system and electronic device using the cipher generating technique.

2. Related Art

Conventionally, in the case of encryption using chaos, it is customary to use floating point arithmetic. However, if floating point arithmetic is used, there are differences in computing characteristics between processors respectively mounted in a device for performing encryption and a device for carrying out decryption, causing disadvantages such as not carrying out appropriate decryption. In order to address this problem, emulation of different processors has been considered, but this is only feasible on a platform that has been prepared in a development environment, and creation of such an environment is not possible with a CPU used in a mobile device or a CPU mounted in various electronic devices.

The inventor of this application has proposed a cipher generating device etc. for first of all carrying out chaotic computations using integer arithmetic and bit arithmetic, that does not depend on a floating point processor (Japanese patent application 2000-101402.

SUMMARY OF THE INVENTION

The present invention has been conceived in order to further advance the method in the above proposals, and an object of the present invention is to provide a cipher generating device and a cipher generating program for carrying out encryption having sufficient security through integer arithmetic and bit arithmetic, to provide a cipher decoding device and cipher decoding program capable of appropriately decoding this encrypted cipher, and to provide an authentication system electronic device substantially sharing the encryption and decryption processing to perform appropriate authentication, and an electronic device used in this system.

A cipher generating device of the present invention, for carrying out computation, for plain text information, to apply chaotic noise obtained using a mapping function for generating chaotic noise based on encryption key data, to generate a cipher, comprises parameter generation means for generating a parameter string for use in chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation.

Also, the cipher generating device of the present invention is provided with initial phase determination means for determining initial phase, being the order for providing the parameter string to the chaotic noise generating means.

A cipher decoding device of the present invention, for decoding cipher text, generated using a cipher generating device for carrying out appropriate computation, for plain text information, of chaotic noise obtained using a mapping function for generating chaotic noise based on encryption key data, to generate a cipher, and comprising parameter generation means for generating a parameter string for use in chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation, to return the cipher text to original text, comprises parameter string generating means for generating a parameter string using chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation.

Also, the cipher decoding device of the present invention is provided with initial phase determination means for determining initial phase, being the order for providing the parameter string to the chaotic noise generating means.

A cipher generating program of the present invention, for generating a cipher used in a cipher generating device for carrying out appropriate computation, for plain text information, of chaotic noise obtained using a mapping function for generating chaotic noise based on encryption key data, to generate a cipher, comprises parameter generating step for generating a parameter string for use in chaotic computation based on the key data, a chaotic noise generating step for carrying out chaotic computation using the parameter string generated in the parameter generating step and obtaining the chaotic noise, and a scheduling step for carrying out scheduling of the parameter string so as to cause a change in the parameter string every fixed cycle the parameter string is used in the noise computation.

A cipher decoding program of the present invention, used in a cipher decoding device for decoding cipher text, generated using a cipher generating device for carrying out appropriate computation, for plain text information, of chaotic noise obtained using a mapping function for generating chaotic noise based on encryption key data, to generate a cipher, and comprising parameter generation means for generating a parameter string for use in chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation, to return the cipher text to original text, comprises a parameter string generating step for generating a parameter string using chaotic computation based on the key data, a chaotic noise generating step for carrying out chaotic computation using the parameter string generated in the parameter generating step and obtaining the chaotic noise, and a scheduling step for carrying out scheduling of the parameter string so as to cause a change in the parameter string every fixed cycle the parameter string is used in the chaotic computation.

An authentication system of the present invention, comprising an authentication device for performing authentication and an authentication request device for requesting authorization to the authorization device, wherein the authentication request device is provided with parameter generation means for generating a parameter string for use in chaotic computation based on key data transmitted from the authentication device and key data possessed by the authentication request device, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the noise computation, and returns chaotic noise generated by the chaotic noise generating means to the authentication device as authentication code information, while the authentication device is provided with parameter generation means for generating a parameter string for use in chaotic computation based on the key data transmitted from the authentication device and key data possessed by the authentication request device, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the noise computation, and compares chaotic noise generated by the chaotic noise generating means with the authentication code information returned from the authentication request device to obtain an authentication result.

An electronic device of the present invention, for requesting authentication to an authentication device for performing authentication, comprises parameter generation means for generating a parameter string for use in chaotic computation based on key data transmitted from the authentication device and key data possessed by the authentication request device, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the noise computation, and returns chaotic noise generated by the chaotic noise generating means to the authentication device as authentication code information.

BRIEF DESCRIPTION OF THE DRAWINGS

FIG. 13 is a drawing showing one example of a chaos function used in cipher generation, cipher decoding and authentication code creation of the present invention.

FIG. 14 is a drawing showing one example of a chaos function used in cipher generation, cipher decoding and authentication code creation of the present invention.

EMBODIMENTS OF THE INVENTION

Figure 1:
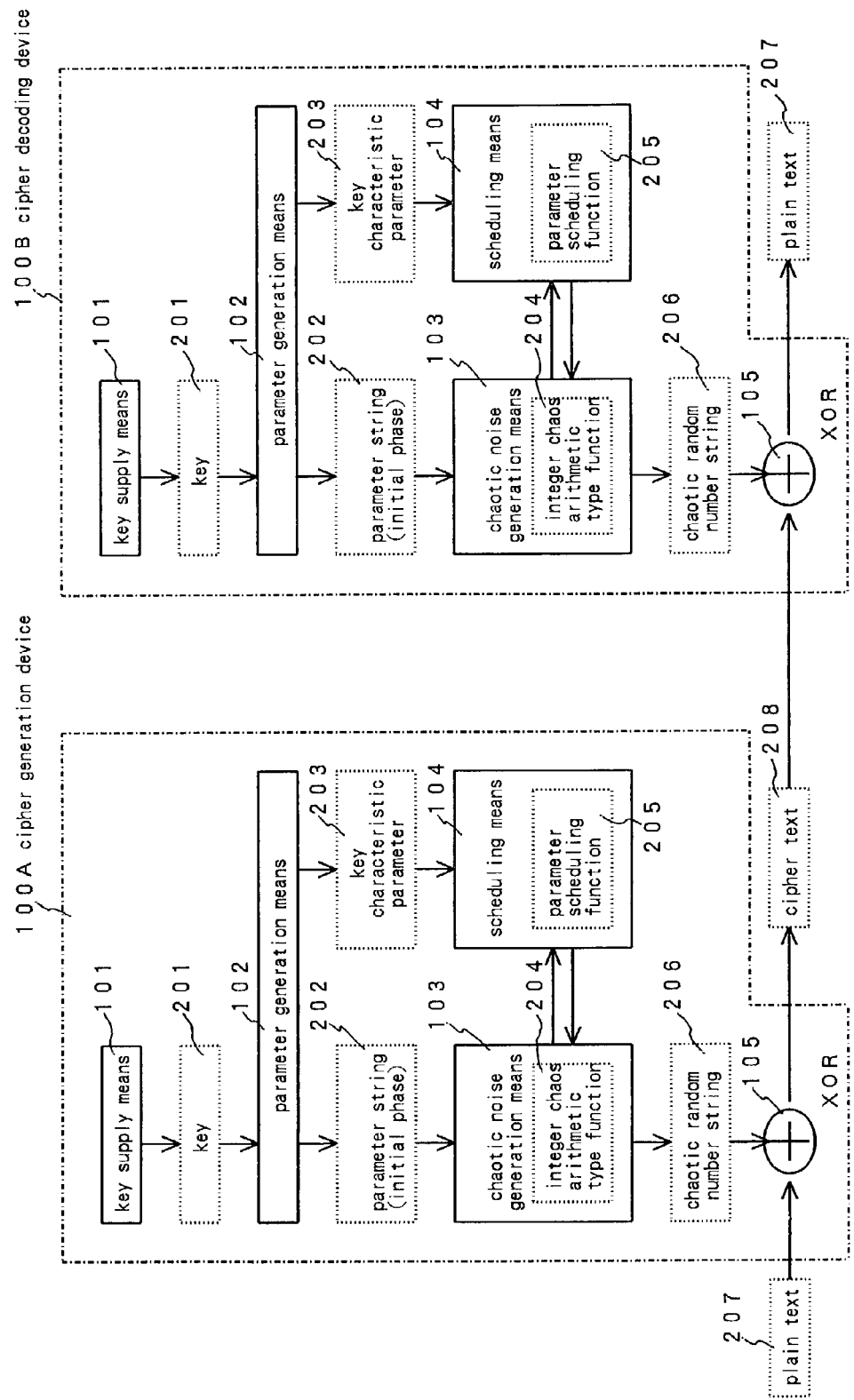
FIG. 1 is a drawing showing the structure of a cipher generating device and a cipher decoding device of the present invention.

A cipher generation device, cipher decoding device, cipher generation program, cipher decoding program, authentication system and electronic device of the present application will now be described in the following with reference to the attached drawings. The same reference numerals are affixed to the same structural elements in each drawing, and repeat description of these parts will be omitted. A structural example of a cipher generating device 100A and a cipher decoding device 100B is shown in FIG. 1. The cipher generating device 100A and the cipher decoding device 100B have the same structure, so a description will be given for the cipher generating device 100A.

The cipher generating device 100A generates a cipher by performing appropriate computation, for plain text information 207, of chaotic noise obtained using a mapping function for generating chaotic noise based on encryption key data, and comprises key supply means 101, parameter generation means 102, chaotic noise generation means 103 and scheduling means 104.

The key supply means 101 supplies key data 201 constituting a source for chaotic noise generation. The parameter generation means 102 generates a parameter sting (holding initial phase) 202 for use in chaotic computation based on the key data 201. This parameter generation means 102 generates a key characteristic property parameter 203 based on the key data 201.

The chaotic noise generation means 103 performs in chaotic computation using the parameter string 202, and obtains a chaotic random number sequence 206, being chaotic noise. At this time, the chaotic noise generation means 103 uses an integer arithmetic type chaotic function 204. The scheduling means 104 carries out scheduling for the parameter string 202 so that the parameter string 202 is updates every fixed cycle (in this embodiment, one cycle) that the parameter 202 is used in chaotic computation of the chaotic noise generation means 103, and uses a parameter scheduling function 205 in this scheduling.

Plain text 207 and the chaotic random number sequence 206 generated by the chaotic noise generation means 103 are subjected to an exclusive-OR operation by an exclusive-OR circuit 105 to obtain encrypted text 208. This encrypted text 208 is transmitted to the cipher decoding device 100B, and in the cipher decoding device 100B the encrypted text 208 and a chaotic random number sequence 206 generated in the same way as in the cipher generating device 100A are subjected to an exclusive-OR operation by the exclusive-OR circuit 105 to return the encrypted text 208 to plain text 207.

The process of creating chaotic noise in the cipher generating device 100A and the cipher decoding device 100B is handled using integer arithmetic. Here, integer arithmetic is described as only integer arithmetic types such as int or long in the C programming language, and not does not involve floating point arithmetic types such as float or double at all. Also, it does not mean software emulation of floating point arithmetic using integer arithmetic, but means carrying out expanded integer arithmetic design from a chaos generating structure to a mapping function itself, which is a fundamental process of making integers.

Figure 2:
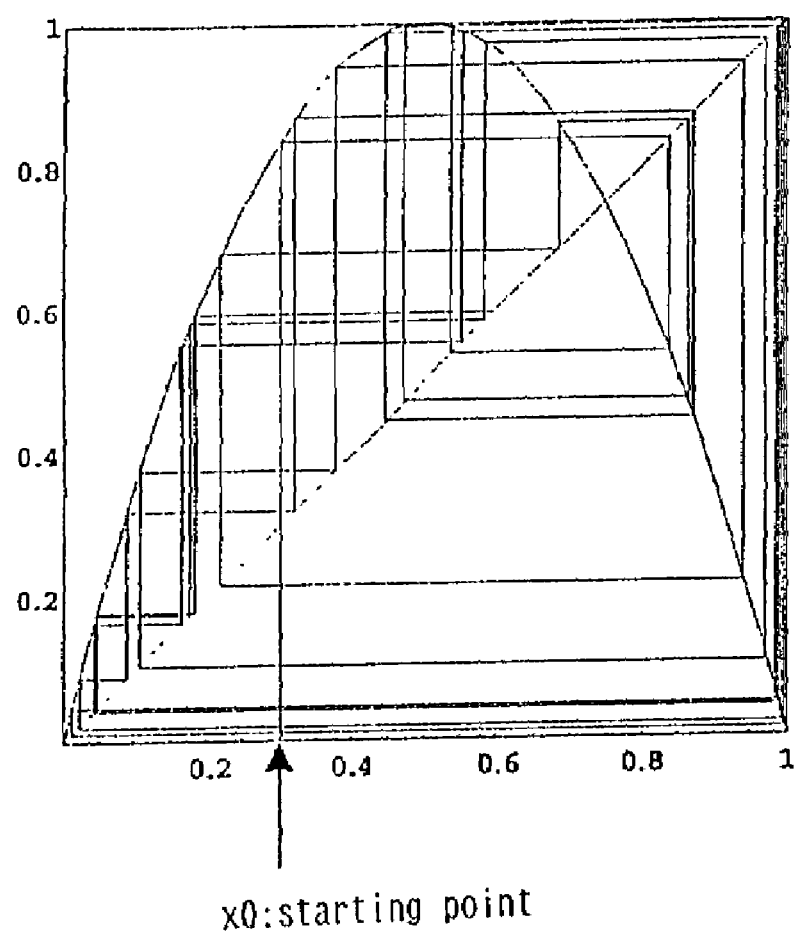
FIG. 2 is a drawing showing the geometrical generation structure of mapping type chaos.

The basis of chaos generation using integer arithmetic is as follows. With respect to the basis of chaos generation using integer arithmetic, and the integer arithmetic design for a mapping function, particularly for mapping type chaos such as logistic mapping, tent mapping, and Bernoulli shift mapping, by having a 2 dimensional geometrical generation structure, the geometrical generation structure is maintained even if the mapping range is increased to a range in which integer arithmetic is possible. This will be described using FIG. 2. With the function shown in FIG. 2, x0 is made a starting point, and reflected (mapped) from the mapping function value y=ax(1−x) at that point to y=x. Chaos is generated through the course of repeating (iterating) this type of simple operation. This geometric structure is theoretically held even if both length and width are increased (the same as an expanded copy).

Problematic points with the above described integer arithmetic method will now be described. In the integer arithmetic for chaos, compared to a floating point arithmetic type the amount of information to be handled is reduced, and computing precision and resolution are lowered. A total number of chaos states is reduced, there is a degenerative effect on previous self orbit, and short cycles accompanying this are remarkable. At the same time, the range of chaos parameter data capable of being used as key data and initial values is reduced, and countermeasures are necessary in order to maintain sufficient key length.

Figure 3:
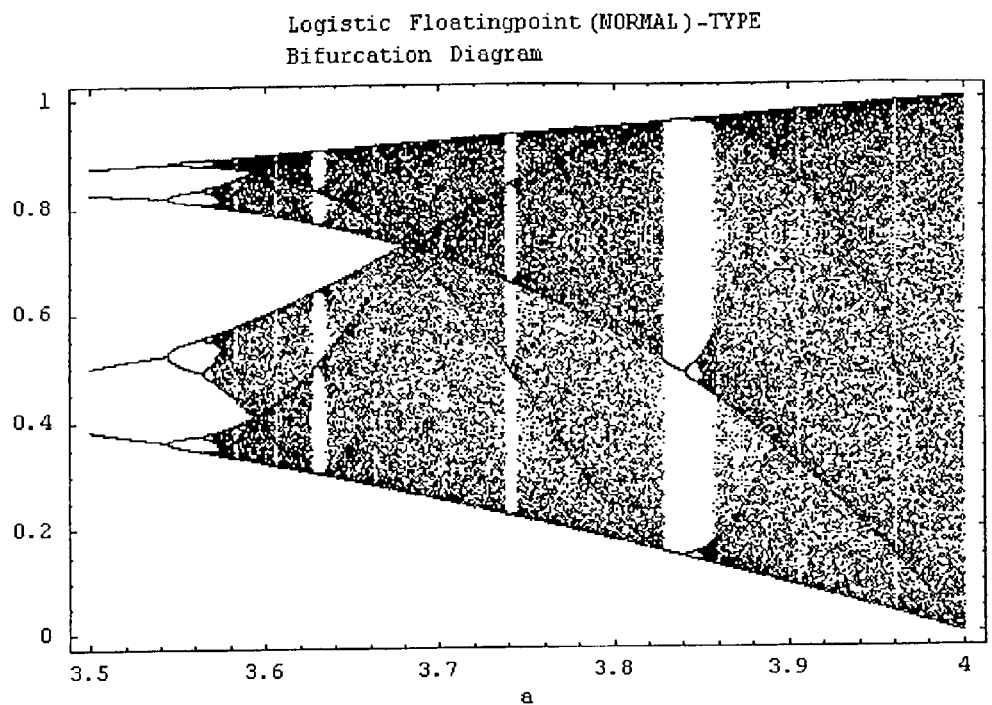
FIG. 3 is a bifurcation diagram using floating point arithmetic.
Figure 4:
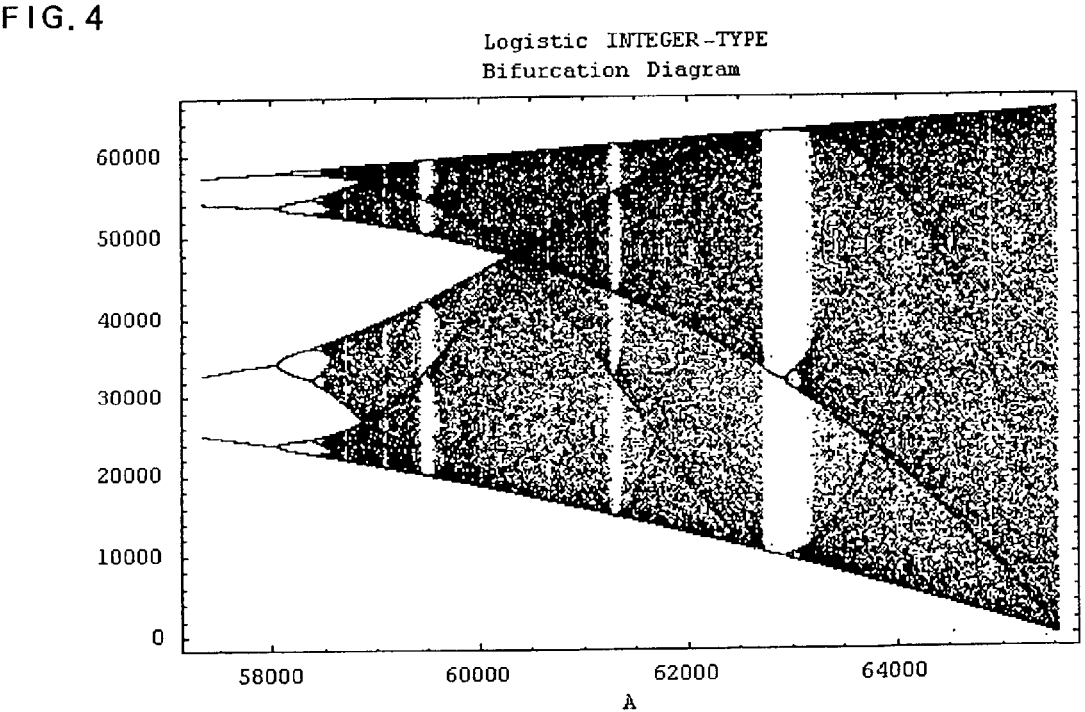
FIG. 4 is a bifurcation diagram using integer arithmetic.
Figure 5:
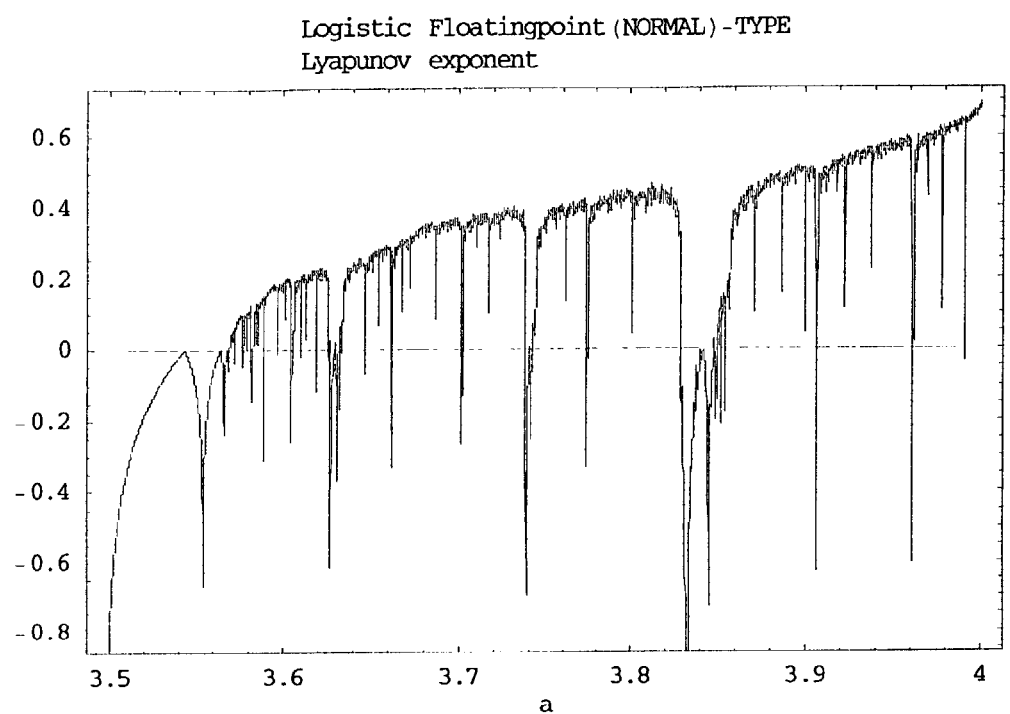
FIG. 5 is a drawing showing a Lyapunov exponent using floating point arithmetic.
Figure 6:
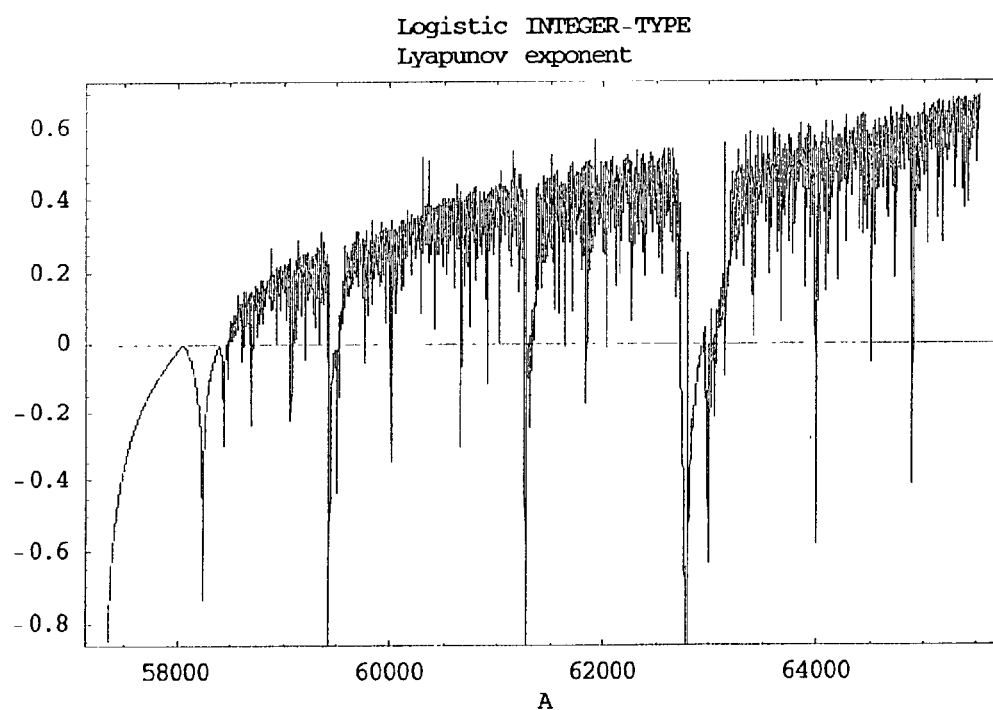
FIG. 6 is a drawing showing a Lyapunov exponent using integer arithmetic.

A means of resolving associated integer arithmetic problems is as follows. With integer arithmetic, the number of chaos states is not reduced and is remarkable in the short-term, but a Lyapunov exponent expressing the frequency of chaotic divergence shows the same positive value in the same region as a floating point arithmetic type, and various chaotic properties such as initial condition susceptibility and orbit disorder are saved. FIG. 3 is a bifurcation diagram for logistic mapping floating point arithmetic, and FIG. 4 is a bifurcation diagram for integer arithmetic. Also, FIG. 5 is a drawing showing a Lyapunov exponent for floating point arithmetic and FIG. 6 is a drawing showing a Lyapunov exponent for integer arithmetic. From these drawing FIG. 3 and FIG. 4, the same chaotic properties can be discerned in respectively similar parameter regions.

With the present invention, the objective is to cause chaos parameters to change to new ones periodically, and made long-term in a pseudo manner. That is, a new initial parameter change pattern is promoted as a key value.

Here, a function for causing periodic change of parameters is called a parameter scheduling function (two-stage function).

The basic structure for generating a cipher and the structure for decoding a cipher in this embodiment have basically the same structure at that of an already existing synchronous chaotic encryption method, but as has already been shown in FIG. 1, is characterized by the fact that a chaotic function is a proprietary function designed as integer arithmetic, and that fact that the structure additionally has a parametric scheduling function for adding periodic changes to parameters to be newly passed to the chaotic function.

Next, an integer arithmetic chaotic function used above will be exemplified.

design Example of Primary Mapping Function (Transformation Tent Mapping Type)

Tent mapping is defined as:

$$y=2x, (x<0.5) \qquad (1\text{-}A)$$

$$y=2(1-x) \; (x>0.5) \qquad (1\text{-}B)$$

However, the mapping range is 0<x<1.0

Here, the y values (output) of the equations (1-A) and (1-B) are x values (input) for the next cycle calculation. In accordance with the equations (1-A) and (1-B), there is a simple feed back structure for generating sequential y value string (chaotic random number sequence).

With tent mapping, a mapping central axis x=0.5 is a symmetrical straight line at a boundary, and so $$\text{when } x<0.5, y=2x \qquad (2\text{-}A),$$

$$\text{and when } x>0.5, \text{ after processing for } x=1-x, y=2x \qquad (2\text{-}B)$$

can be stated.

Figure 7:
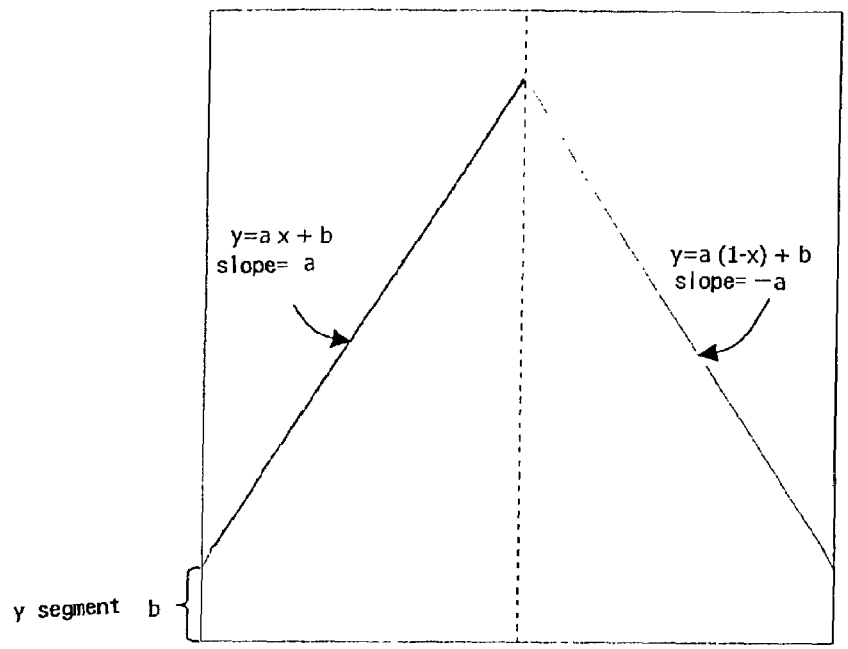
FIG. 7 is a drawing showing one example of a chaos function used in cipher generation, cipher decoding and authentication code creation of the present invention.

Here, in order to increase the parameter pattern, the tent mapping is transformed as follows. Also, if the same x=0.5 is made the mapping boundary, then $$\text{when } x<0.5, y=ax+b \qquad (3\text{-}A),$$

$$\text{and when } x>0.5, \text{ after processing for } x=1-x, y=ax+b \qquad (3\text{-}B)$$

will be considered. The relevant napping function is shown in FIG. 7.

Next, integer arithmetic will be considered. Here, extended mapping, such as a mapping range of $$0<x<2M \text{ (M is a positive integer)} \tag{4}$$

will be considered, and the position of the axis is made the mapping center x=M. Also, if a=A/M and b=B/M, and if the mapping function is made f(x), then $$\text{when } x<M, f(x)=(Ax)/M+B \tag{5-A}$$, and $$\text{when } x \geq M, \text{ after processing for } x=2M-x, f(x)=(Ax)/M+B \tag{5-B}$$

(values of A, B, x, and f(x) are positive integers, No. of decimal places rounded off).

Figure 8:
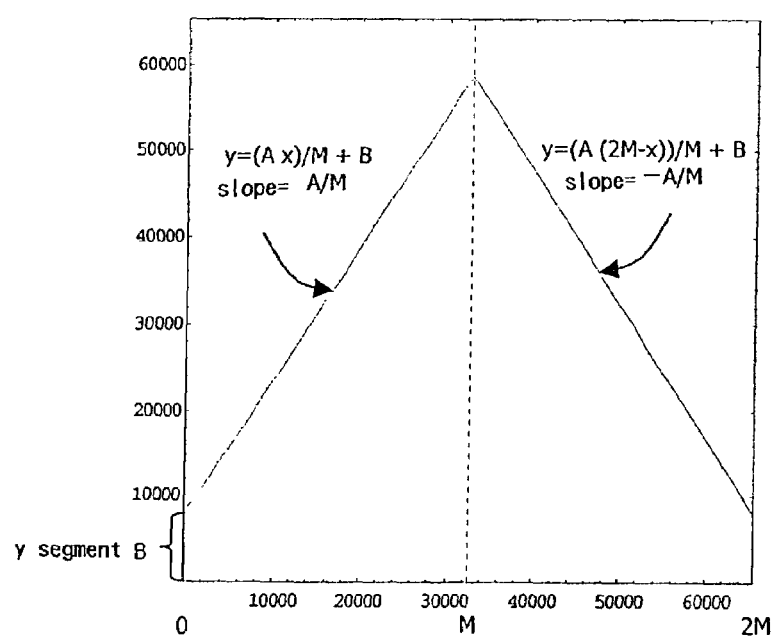
FIG. 8 is a drawing showing one example of a chaos function used in cipher generation, cipher decoding and authentication code creation of the present invention.

The relevant mapping function is shown in FIG. 8.

Here, if M is made an exponent of 2 (M=$2^K$), operation parts of equation (5-A) and equation (5-B) can be expressed by bit shifting, such that $$f(x)=(Ax)>>K+B \tag{6}$$

(>>K means a K bit right shift operation).

Specifically, if an M value is considered, for example, in the case of using a long int type (double precision integer operation type) in a 32-bit CPU, designation is possible up to M=32768. On this case K=15 (M=$2^K$).

Here, A and B are chaos parameters of the present invention, and a region that may be allocated to the parameters A and B is as follows.

Here, a range of A, because of the orbit diffusion condition (✕1), must generally satisfy $$1<A/M<2$$

that is, $M<A<2M$ \tag{7}.

Orbit Diffusion Condition (✕1)

The orbit diffusion conditions is the fact that an absolute value of a slope of the mapping function satisfies (|f'(x)|>1) in all regions within the mapping range. Therefore, a Lyapunov exponent for each iteration always becomes positive ($\lambda>0$). Also, a maximum value obtained from the function (6) equation, at the time x=M, must be less than the mapping range 2M, which means that $$f(M)=(AM)/M+B<2M \rightarrow A+B<2M \tag{8}.$$

Therefore, A and B are made roughly the same range, and the value of A is preferably larger which means that a function of $$0<B\leq \Delta B \text{ } (\Delta B \sim M/2) \tag{9}$$

$$L=2M-\Delta B$$

$$L-\Delta A \leq A<L \text{ } (\Delta A \sim M/2) \tag{10}$$

is obtained.

With 32-bit processor direct computation (not multiple division), M=32768, which means that $$\Delta A \sim \Delta B \sim M/2 = \text{approximately 16384 (16-bit signal)} \tag{11}.$$

Since as large a value of A as possible improves the degree of chaotic divergence, the values of ΔA and ΔB from equation (9) and equation (10) are preferably small, but in that situation a total number of parameters to be obtained becomes small. Therefore, here, a range of about $$\Delta A \sim \Delta B = 4096 \text{ } (=2^{12}) \tag{12}$$

will be considered.

Also, in relation to a parameter variable system that will be described later, under the condition that, with ΔA and ΔB being prime numbers of roughly the same magnitude, $$\Delta A \neq \Delta B \text{ (✕2)} \tag{13},$$

these values are made $$\Delta A = 4099 \tag{14}$$

$$\Delta B = 4111 \tag{15}.$$

From equations (9), (10), (14) and (15), the range in which parameters of this example can be designated is $$\text{A: } 57326 \leq A \leq 61424 \text{ } (\Delta A=4099) \tag{16}$$

$$\text{B: } 1 \leq B \leq 4111 \text{ } (\Delta B=4111) \tag{17}.$$

These parameter ranges of A and B are variable ranges that can be used in a parameter scheduling function that will be described later.

Next, a discussion will be given relating to improving precision in operating parts of equation (6). Here, since M=32768=$2^{15}$ (K=15), equation (6) is rewritten as $$f(x)=(Ax)>>15+B \tag{18}.$$

In equation (18), after expansion computation of A×x, compression is carried out with a 15-bit right shift to remove the lower 15-bits of information.

On the other hand, since range of A is greater than $2^{15}$ and less than $2^{16}$, as shown in equation (16), the 15-bit deleted information sometimes results in a difference of at least 1 during the course of expansion computation of the next cycle. Accordingly, consideration has been given to storing the lower 15-bits of information prior to the 15-bit right shift operation, and making this information valid during the course of the expansion computation of the next cycle. In this case, in the first loop, substituting xb=0, $$x2=Ax+((Axb)>>15) \tag{19-A}$$

$$xb=x2\&15 \tag{19-B}$$

$$f(x)=x2>>15+B \tag{19-C}$$

are derived. Output f(x) of equation (19-C) is the input x for equation (19-A) of the next cycle)

Figure 9:
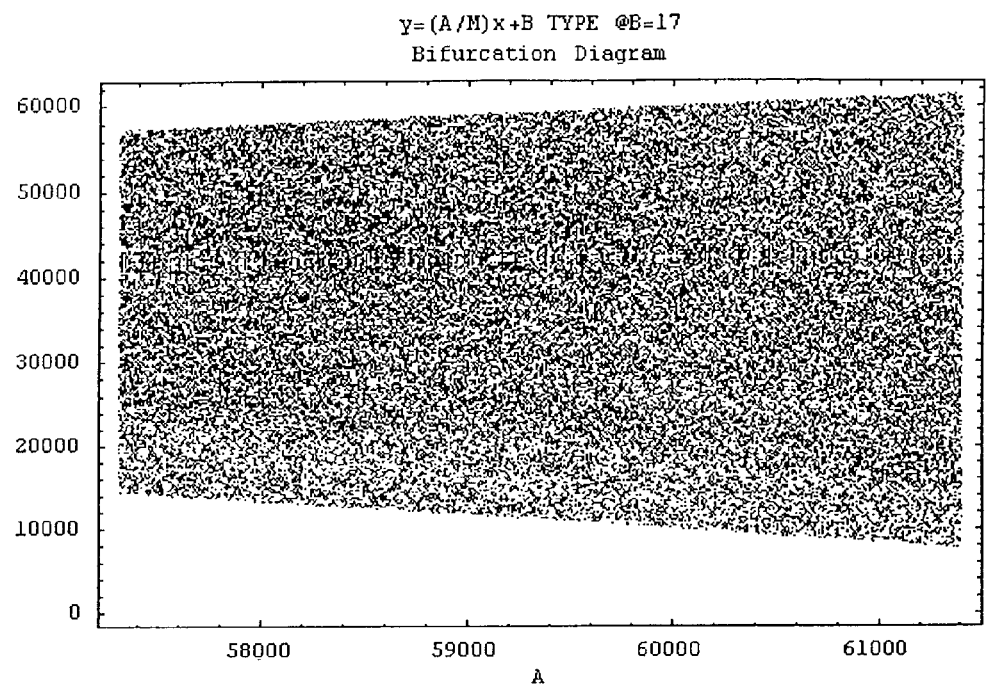
FIG. 9 is a bifurcation diagram with integer arithmetic using the chaos function of FIG. 7.
Figure 10:
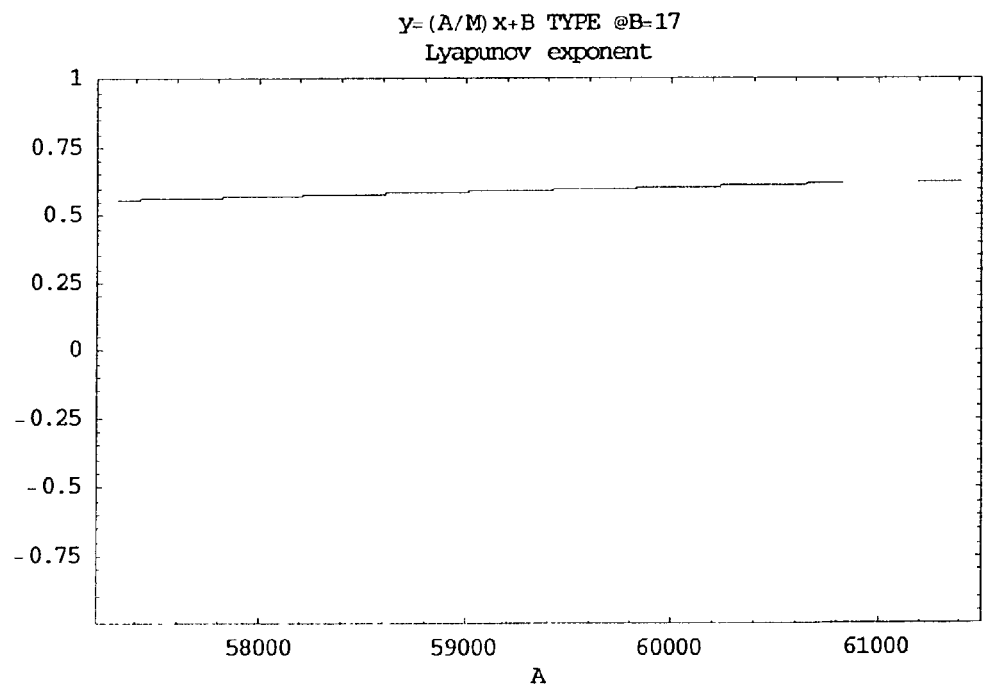
FIG. 10 is a drawing showing a Lyapunov exponent with integer arithmetic using the chaos function of FIG. 7.

Here, in the integer arithmetic design primary mapping function (transformation tent mapping) shown in (5-A and 5-B), the appearance of chaos generation for the parameter variable width shown in equations (14) and (15) and parameter variable range shown in equations (16 and 17) is shown in the bifurcation diagram of FIG. 9 and the drawing of the Lyapunov exponent in FIG. 10. FIG. 9 and FIG. 10 are parameter fixed (original chaos before causing variation of parameters).

From FIG. 9 and FIG. 10, it can be confirmed that the integer arithmetic design primary mapping function is a chaotic regime continuous across the entire parameter range considered.

For example, compared to the logistic mapping shown in FIG. 4 and FIG. 6 which has a chaotic regime that is discontinuous within the parameter range considered, the continuous chaotic regime of the design function can expect a simple system such as not requiring 'if' branching even for consideration of a parameter variable system.

Secondary Mapping Function (Transformation Logistic Mapping Type) Design Example In the case of logistic mapping, a compression region having a gradient of less than 1 exists at the center ($x=0.5$) of the mapping range. In the integer arithmetic of this system, a function is designed to eliminate a degeneration region of the logistic mapping due to the fact that degeneracy generation tends to make the cycle finish early, and maintain a slope at the center ($x=0.5$) of a new mapping range at at least 1 (single stage differential values at the center of the mapping range become discontinuous).

Here, the secondary function to be designed is made $$f(x)=ax^2+bx+c \quad (20)$$

A mapping range that has been expanded through integer arithmetic is made $0<x<2M$, and a function that is upwardly convex on similar logistic mappings (two stage differential values are negative) is considered. Also, here an axis of symmetry of a particular mapping is made $x=M$ (middle of the mapping range). In this case, a right side function ($M<x<2M$) becomes the same as a left side function ($0<x<M$) after the operation of $x=2M-x$, and so in the following the right side function will be described.

Also, by taking into consideration the condition ($\dot{X}$-1) that adjacent orbits do not cause degeneration, the function shape provided in equation (20) fits the following conditions.

$$f(M)=h \ (<2M) \text{ maximum value condition } (h \text{ is an integer value}) \quad (21)$$

$$f(0)=0 \text{ minimum condition} \quad (22)$$

$$f'(M)=r>1 \text{ slope is at least 1 condition} \quad (23)$$

$$a<0 \text{ upwardly convex} \quad (24)$$

Figure 12:
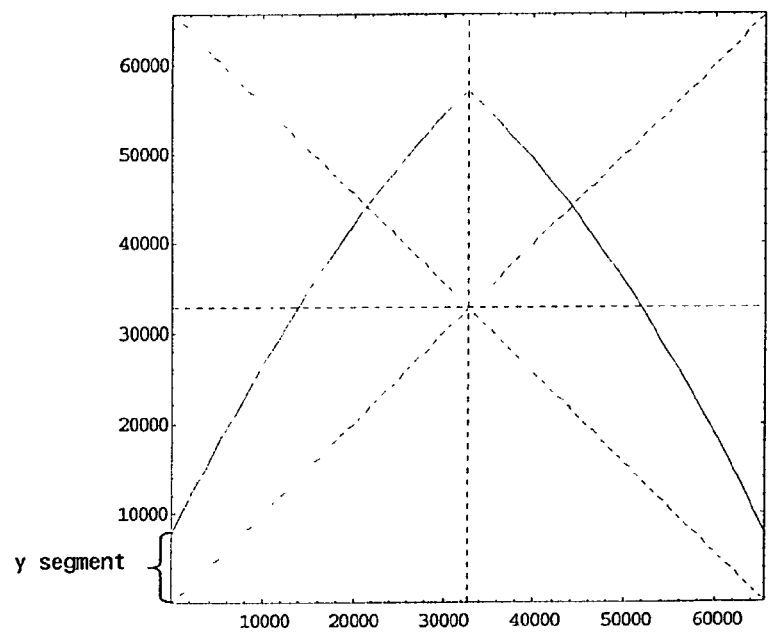
FIG. 12 is a drawing showing one example of a chaos function used in cipher generation, cipher decoding and authentication code creation of the present invention.

With respect to a, b and c, if a general solution and conditions are arranged, then $$a=-(h-Mr)/M^2 \quad (25)$$

$$b=(2h-Mr)/M \quad (26)$$

$$c=0 \quad (27)$$

$$r>1 \quad (28)$$

$$a<0 \quad (29)$$

are derived, and in the case where $x>M$, $$f(x)=((2h-Mr)/M)x-((h-Mr)/M^2)x^2 \quad (30)$$

$$1<r<h/M \quad (31)$$

for carrying out $x=2M-x$ conversion are provided. The relevant mapping function is shown in FIG. 12.

Figure 11:
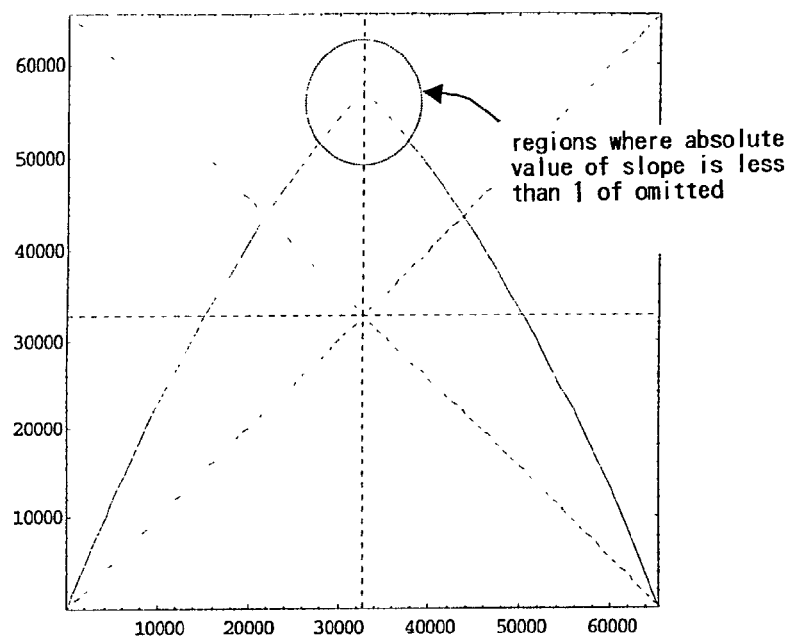
FIG. 11 is a drawing showing one example of a chaos function used in cipher generation, cipher decoding and authentication code creation of the present invention.

Here, $r=R/M$ (R is an integer value) is established, and in particular, due to the fact that $r<2$ and the conditions of equation (23), in the case where $x>M$, $$f(x)=((2h-R)x)/M-((h-R)x^2)/M^2 \quad (32)$$

$$M<R<h<2M \quad (33)$$

for $x=2M-x$ conversion are obtained (refer to FIG. 11).

Here, the case where $M=2^K$ can be expressed with partial bit arithmetic.

Also, with 32-bit (unsigned long type) when $M=32768$ ($K=15$) in the secondary function case, if the fact that multiple stage processing is required, and precision correction are considered, there is the following arrangement. (provided the first cycle is $xb=0$)

$$a1=((2h-R)xb)>>K$$

$$b1=(x^2)>>K$$

$$b2=(x^2)\&(M-1)$$

$$c1=(2\times xb)>>K$$

$$d1=((h-R)(b2+c1))>>K$$

$$sss=(2h-R)x+a1-(h-R)b1-d1$$

$$f(x)=sss>>K$$

$$xb=sss\&(M-1) \quad (34)$$

Particularly in the case where precision correction is not carried out (forced rounding), $$b1=(x^2)>>K$$

$$b2=(x^2)\&(M-1)$$

$$d1=((h-R)b2)>>K$$

$$sss=(2h-R)x-(h-R)b1-d1$$

$$f(x)=sss>>K \quad (35).$$

Here, h and R are chaos parameters, and are linked to a parameter scheduling function that will be described later.

The range for obtaining h and R is set to a range that satisfies restraint conditions of equation (33). Also, the total number $\Delta h$ and $\Delta R$ of values respectively obtained is substantially the same, and so $$\Delta h \sim \Delta R \sim 2^{12} \ (<M/2)$$

is set, and under the condition that $\Delta h:=$(nearly equals) $\Delta R$, and prime numbers are appointed (described later), $$h: 61436 \leq h \leq 65534 \ (\Delta h=4099) \quad (36)$$

$$R: 57325 \leq R \leq 61435 \ (\Delta R=4111) \quad (37)$$

are given.

Figure 15:
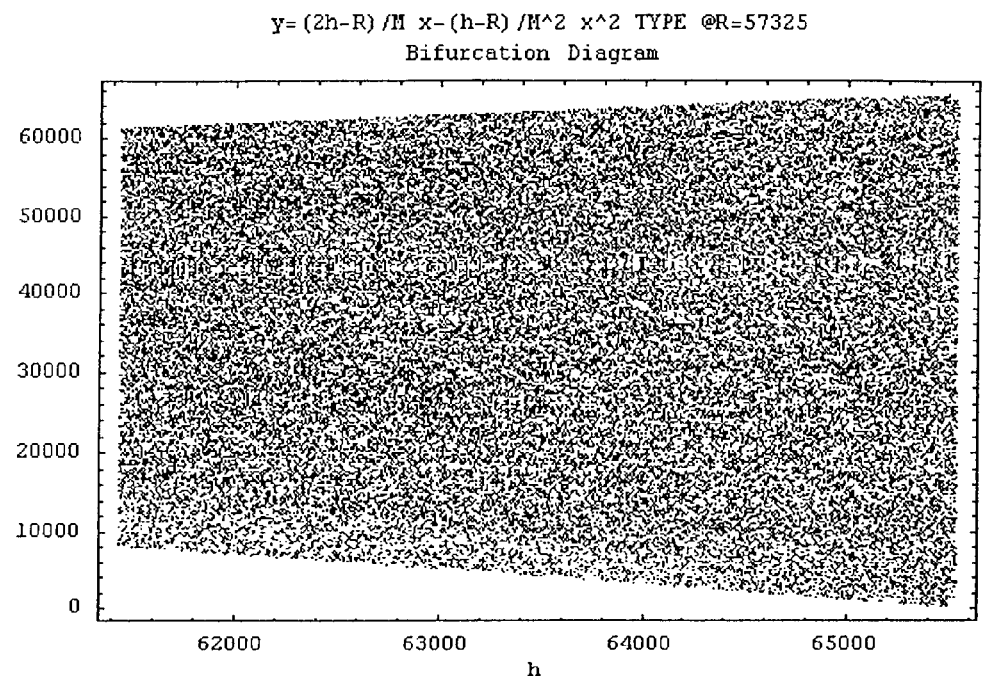
FIG. 15 is a bifurcation diagram with integer arithmetic using the chaos function of FIG. 11.
Figure 16:
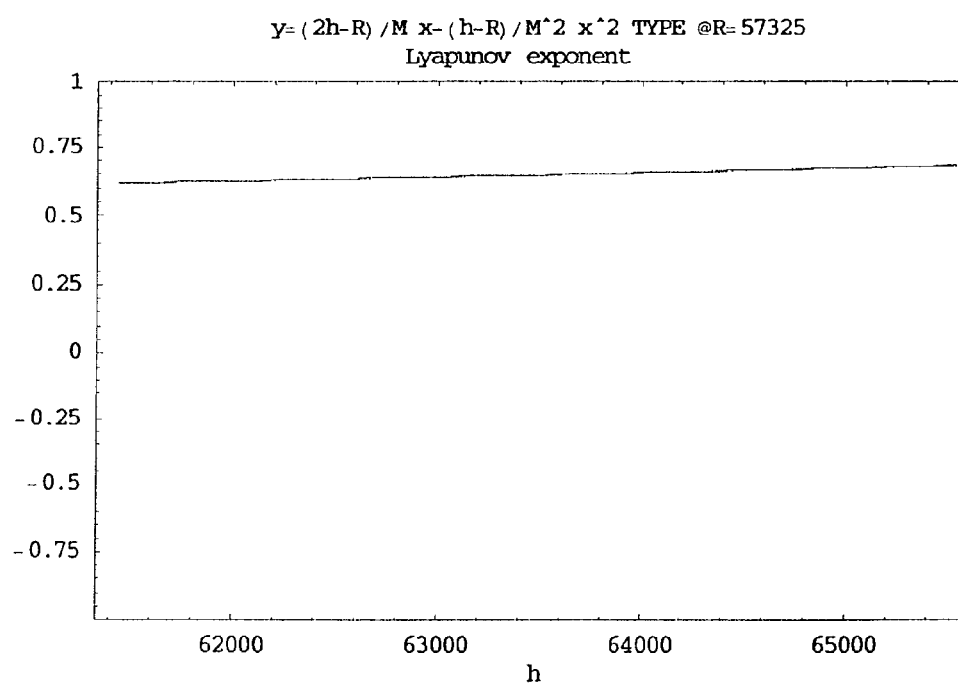
FIG. 16 is a drawing showing a Lyapunov exponent with integer arithmetic using the chaos function of FIG. 11.

Here, in the integer arithmetic design secondary mapping function (transformation logistic mapping) shown in (32), the appearance of chaos generation in the parameter variation width and parameter variation range shown in (36) and (37) is shown in the bifurcation diagram of FIG. 15 and the Lyapunov exponent of FIG. 16.

FIG. 15 and FIG. 16 are for fixed parameters (element chaos before causing variation in parameters).

From FIG. 15 and FIG. 16, it is possible to confirm that the integer arithmetic design secondary mapping function has a chaotic regime that is continuous across the entire range of considered parameters. For example, compared to the logistic mapping shown in FIG. 4 and FIG. 6 which has a chaotic regime that is discontinuous within the parameter range considered, the continuous chaotic regime of the design function can expect a simple system such as not requiring 'if' branching even for consideration of a parameter variable system.

Other Function Systems (Increasing Number of Parameters)

Method of Adding Primary Function Type Similar y Section Displacement With Secondary Function Type With a secondary function type, the same as with the primary function type, it is possible to provide a y section at both ends of the mapping range (x=0, x=2M). A mapping function of a relevant example is shown in FIG. 12. In this case, a parameter providing a new y section displacement is increased by 1, contributing to lengthening the cycle.

Method for Setting Left and Right Mapping Functions to Different Function Types

Here, a description has been given where, with the center of the mapping range as an axis of symmetry, left and right function types are the same function, but by adopting different function types at the left and right, the number of parameters is doubled. In this way, it is possible to anticipate immense lengthening of the cycle. Relevant mapping functions are shown in FIG. 13.

Displacement of Mapping Axis

Here, an explanation has been given for a model where the axis of symmetry is in the center of the mapping range. The reason for this is that bit arithmetic has been considered, but it is also possible to consider a method of moving the axis away from the mapping center as shown in FIG. 14, for example. In this case, it is possible to provide a displacement of the axis in the x direction as a new parameter, contributing to lengthening of the cycle.

Secondary Mapping Function (Extra Example 1)
Identification: 2 parameter mode, mapping central axis symmetrical type
basic function type: $y=ax^2+bx$
Design function: left side function: $f(x)=(2h-R)/Mx-(h-R)/M^2x^2$
right side function: after conversion for $x=2M-x$, the same as the left side function
parameter h[ ], R[ ]
parameter limit $M<R<h<2M$
Since, as h–R increases, the secondary effects (non-linear) of the design function become large, and also taking into consideration the fact that it is preferable, at the same time, for the extent of chaotic divergence (Lyapunov exponent) to be large,
a parameter domain of ⊚h occupies Δh from a side close to the maximum value 2M.
a parameter domain of ⊚R occupies ΔR from a side close to the minimum value M.
as a request from a parameter scheduling function
⊚ it is requested that Δh≠ΔR, and that they are respectively prime numbers.
as a limiting condition on the mapping function design,
⊚ the rule h>R always needs to be preserved.
if Δh>ΔR is then established, then
a domain of roughly ΔR<Δh<M/2 (=16384) is held.
Cycle potential: in this case, a cycle potential of roughly maximum $(2^{16})^2×$(key length/16) is held.

(Exemplification)
Cycle: When Δh=4111, ΔR=4099 are provisionally set, cycle is 4099×4111×(key length/16),
so with a key length of 128-bits, 128M, and with a key length of 1024-bits 1024M (1G) and at this time,
$2M-1-(\Delta h-1)\leq h\leq 2M-1 \rightarrow 61425\leq h\leq 65535$
$M+1\leq R\leq M+1+(\Delta R-1)\rightarrow 32769\leq R\leq 36867$ Secondary Mapping Function (Extra Example 2)
identification: 4 parameter mode, mapping central axis symmetrical type, independent left right function operation
basic function type: $y=ax+bx$
Design function: left side function: $f(x)=(2h1-R1)/Mx-(h1-R1)/M^2x^2$
right side function: $f(x)=(2h2-R2)/Mx-(h2-R2)/M^2x^2$
parameters h1[ ], h2[ ], R1[ ], R2[ ]
parameter limits $M<R<h<2M$ Since, as h1–R1 and h2–R2 increase, the secondary effects (non-linear) of the design function become large, and also taking into consideration the fact that it is preferable, at the same time, for the extent of chaotic divergence (Lyapunov exponent) to be large,
a parameter domain of ⊚h1 occupies Δh1 from a side close to the maximum value 2M.
a parameter domain of ⊚h2 occupies Δh2 from a side close to the maximum value 2M.
a parameter domain of ⊚R1 occupies ΔR1 from a side close to the minimum value M.
a parameter domain of ⊚R2 occupies ΔR2 from a side close to the minimum value M.
as a request from a parameter scheduling function
⊚ it is requested that Δh1≠Δh2≠ΔR1·ΔR2 and that they are respectively prime numbers,
as a limiting condition on the mapping function design
⊚ the rules h1>R1, and h2>R2 always need to be preserved.
and if Δh1>ΔR1 and Δh2>ΔR2 are established, then
a domain of roughly ΔR1<Δh1<M/2 (=16384) is held, and
a domain of roughly ΔR2<Δh2<M/2 (=16384) is held.
Cycle potential: in this case, a cycle potential of roughly maximum $(2^{16})2×$(key length/16) is held.

(Exemplification)
Cycle: When Δh1=4111, ΔR1=4099, Δh2=4127 and ΔR2=4129 are set,
cycle is 4099×4111×4127×4129×(key length/16), so with a key length of 128-bits
cycle is 1024G (1T), and
with a key length of 1024-bits cycle is 8192G (8T), and at this time,
$2M-1-(\Delta h1-1)\leq h1\leq 2M-1\rightarrow 61425\leq h1\leq 65535$
$M+1\leq R1\leq M+1+(\Delta R1-1)\rightarrow 32769\leq R1\leq 36867$
$2M-1-(\Delta h2-1)\leq h2\leq 2M-1\rightarrow 61409\leq h2\leq 65535$
$M+1\leq R2\leq M+1+(\Delta R2-1)\rightarrow 32769\leq R2\leq 36897$ Secondary Mapping Function (Extra Example 3)
Identification: 3 parameter mode, mapping center axis object type
basic function type: $y=ax^2+bx+c$
Design function: left side function: $f(x)=(2h-R)/Mx-(h-R)/M^2x^2+c$
right side function: after conversion for $x=2M-x$, the same as the left side function
parameters: h[ ], R[ ], C[ ]
parameter limits: $M<R<h<2M-C$
Since, as h–R increases, the secondary effects (non-linear) of the design function become large, and also taking into consideration the fact that it is preferable, at the same time, for the extent of chaotic divergence (Lyapunov exponent) to be large, ⊚ a parameter domain of h occupies Δh from a side close to the maximum value 2M–ΔC–C0.

◎ The domain of R occupies Δ R from close to the minimum value M.
◎ The domain of C occupies Δ C from close to the minimum value 1.

As request from a scheduling function,
  ◎ it is requested that $\Delta h \neq \Delta R \neq \Delta C$, and that they respectively be prime numbers.

As limiting condition on the mapping function design,
◎ The rule H>R must always be preserved.
◎ The h maximum value must be less than $2M-\Delta C$.
  if $\Delta h > \Delta R > \Delta C$ is then established,
  a domain of roughly $\Delta C < \Delta R < \Delta h < M/3$ (=5461) is held.
  Cycle potential: in this case, a cycle potential of maximum $(5461)^3 \times$(key length/24) is held.

(Exemplification)
Cycle: when $\Delta h = 4127$, $\Delta R = 4111$, and $\Delta C = 4099$ are provisionally set, with $4099 \times 4111 \times 4127 \times$(key length/24) cycle is 341G with a 128-bit key and 2730G (2.67T) with a 1-24 it key.
$2M-1-(\Delta h-1)-(\Delta C-1)-C0 \leq h \leq 2M-1-(\Delta C-1)-C0$ $57310 \leq h \leq 61436$
$M+1 \leq R \leq M+1+(\Delta R-1)$ $32769 \leq R \leq 36879$
$C0 \leq C \leq C0+(\Delta C-1)$ $1 \leq C \leq 4099$ Secondary Mapping Function (Extra Example 4)
Identification: 6 parameter mode, mapping center axis object type, independent left and right function operation
basic function type: $y=ax^2+bx+c$
design function
  left side function: $f(x)=(2h1-R1)/Mx-(h1-R1)/M^2x^2+C1$
  right side function: $f(x)=(2h2-R2)/Mx-(h2-R2)/M^2x^2+C2$
Parameters: h1[ ], h2[ ], R1[ ], R2[ ], C1[ ], C2[ ]
parameter limits: $M<R<h<2M-C$
  Since, as h–R increases, the secondary effects (non-linear) of the design function become large, and also taking into consideration the fact that it is preferable, at the same time, for the extent of chaotic divergence (Lyapunov exponent) to be large, ◎ a parameter domain for h1 occupies Δh1 from close to the maximum value $2M-\Delta C1-C10$.
◎ a parameter domain for h2 occupies Δh2 from close to the maximum value $2M-\Delta C2-C20$.
◎ a parameter domain for R1 occupies ΔR1 from close to the minimum value M.
◎ a parameter domain for R2 occupies ΔR2 from close to the minimum value M.
◎ a parameter domain for C1 occupies ΔC1 from close to the minimum value 1.
◎ a parameter domain for C2 occupies ΔC2 from close to the minimum value 1.

As a request from a parameter scheduling function,
  ◎ It is requested that $\Delta h1 \neq \Delta h2 \neq \Delta R1 \neq \Delta R2 \neq \Delta C1 \neq \Delta C2$, at that they are respectively prime numbers.

As limiting condition on the mapping function design,
  ◎ the rule h>R must always be preserved.
  ◎ the maximum value of h must be less than $2M-\Delta C$.
  If $\Delta h > \Delta R > \Delta C$ is then established,
  a domain of roughly $\Delta C < \Delta R < \Delta h < M/3$ (=5461) is held.
Cycle potential: in this case, a cycle potential of maximum $(5461)^3 \times$(key length/24) is held.

(Exemplification)
Cycle: when $\Delta h1=4127$, $\Delta R1=411$, $\Delta C1=4099$, $\Delta h2=4153$, $\Delta R2=4139$, and $\Delta C2=4133$ are established,
cycle is $4099 \times 4111 \times 4127 \times 4133 \times 4139 \times 4153 \times$(key length/48), and with 128-bits $10922 \times 1000$P (Peta)
$2M-1-(\Delta h1-1)-(\Delta C1-1)-C10 \leq h1 \leq 2M-1-(\Delta C1-1)-C10$ $57310 \leq h1 \leq 61436$
$2M-1-(\Delta h2-1)-(\Delta C2-1)-C20 \leq h2 \leq 2M-1-(\Delta C2-1)-C20$ $57250 \leq h2 \leq 61402$
$M+1 \leq R1 \leq M+1+(\Delta R1-1)$ $32769 \leq R1 \leq 36879$
$M+1 \leq R2 \leq M+1+(\Delta R2-1)$ $32769 \leq R2 \leq 36907$
$C10 \leq C1 \leq C10+(\Delta C1-1)$ $1 \leq C1 \leq 4099$
$C20 \leq C2 \leq C20+(\Delta C2-1)$ $1 \leq C2 \leq 4133$ Secondary Mapping Function (Extra Example 5)
Identification: 5 parameter mode, mapping axis asymmetric type, independent left and right function operation
basic function type: $y=ax^2+bx$
design function
  left side function: $f(x)=(2h1-R1)/Lx-(h1-R1)/L^2x^2$
  right side function: $f(x)=(2h2-R2)/Lx-(h2-R2)/L^2x^2$
Parameters: h1[ ], h2[ ], R1[ ], R2[ ], L[ ]
parameter limits: $L<R<h<2M-C$, $(M<L)$
  If parameter widths (Δh, ΔR, ΔL) for h, R and L are set substantially the same, $\Delta h \approx \Delta R \approx \Delta L2 \approx M/5 \sim 13107$ $(>2^{13})$ $L=M \pm \Delta L/2$, and since, as h–R increases, the secondary effects (non-linear) of the design function become large, and also taking into consideration the fact that it is preferable, at the same time, for the extent of chaotic divergence (Lyapunov exponent) to be large,
◎ a parameter domain for h1 occupies Δh1 from close to the maximum value 2M.
◎ a parameter domain for h2 occupies Δh2 from close to the maximum value 2M.
◎ a parameter domain for R1 occupies ΔR1 from close to the minimum value 6M/5.
◎ a parameter domain for R2 occupies ΔR2 from close to the minimum value 6M/5.
◎ L occupies about $\pm \Delta L/2$ (total A L), with M at the center.

As a request from a parameter scheduling function,
  ◎ It is requested that $\Delta h1 \neq \Delta h2 \neq \Delta R1 \neq \Delta R2 \neq \Delta L$, and that they are respectively prime numbers.

As limiting condition on the mapping function design,
  ◎ the rules $L<R1<h1$, and $L<R2<h2$ must always be preserved.
Cycle potential: in this case, a cycle potential of maximum $(5461)^3 \times$(key length/24) is held.

(Exemplification)
Cycle: when $\Delta h1=4111$, $\Delta R1=4099$, $\Delta h2=4127$, $\Delta R2=4129$, and $\Delta L=4133$ are established,
cycle is $4099 \times 4111 \times 4127 \times 4129 \times 4133 \times$(key length/4), and with 128-bits 3276 P (Peta).
At this time,
$2M-1-(\Delta h1-1) \leq h1 \leq 2M-1 \rightarrow 61425 \leq h1 \leq 65535$
$6M/5+1 \leq R1 < 6M/5+1+(\Delta R1-1) \rightarrow 39322 \leq R1 \leq 43420$
$2M-1-(\Delta h2-1) \leq h2 \leq 2M-1 \rightarrow 61410 \leq h2 \leq 65535$
$6M/5+1 \leq R2 \leq 6M/5+1+(\Delta R2-1) \rightarrow 39322 \leq R2 \leq 43450$
$M-\Delta L/2 \leq L \leq M+\Delta L/2 \rightarrow 30701 \leq L \leq 34833$ Secondary Mapping Function (Extra Example 6)
Identification: 7 parameter mode, mapping axis asymmetric type, independent left and right function operation
basic function type: $y=ax^2+bx+c$
design function
  left side function: $f(x)=(2h1-R1)/Lx-(h1-R1)/L^2x^2$
  right side function: $f(x)=(2h2-R2)/Lx-(h2-R2)/L^2x^2$
Parameters: h1[ ], h2[ ], R1[ ], R2[ ], C1[ ], C2[ ], L[ ]

parameter limits: $L<R<h<2M-\Delta C-C0$, $(M<L)$

If parameter widths ($\Delta h$, $\Delta R$, $\Delta L$) for h, R and L are set substantially the same, $\Delta h \approx \Delta R \approx \Delta L \approx \Delta C \approx 2M/7 \sim 9392$ ($>2^{12}$) $L = M \pm \Delta L/2$, and since, as h1−R1 and H2−R2 increase, the secondary effects (non-linear) of the design function become large, and also taking into consideration the fact that it is preferable, at the same time, for the extent of chaotic divergence (Lyapunov exponent) to be large, ◎ a parameter domain for h1 occupies $\Delta h1$ from close to the maximum value $2M-\Delta C-C0$.

◎ a parameter domain for h2 occupies $\Delta h2$ from close to the maximum value $2M-\Delta C-C0$.

◎ a parameter domain for R1 occupies $\Delta R1$ from close to the minimum value $8M/7$.

◎ a parameter domain for R2 occupies $\Delta R2$ from close to the minimum value $8M/7$.

◎ L occupies about $\pm \Delta L/2$ (total $\Delta L$), with M at the center.

As a request from a parameter scheduling function,

◎ It is requested that $\Delta h1 \neq \Delta h2 \neq \Delta R1 \neq \Delta R2 \neq \Delta C1 \neq \Delta C2 \neq \Delta L$, and that they are respectively prime numbers.

As limiting condition on the mapping function design,

◎ the rules $L<R1<h1$, and $L<R2<h2$ must always be preserved.

Cycle potential: in this case, a cycle potential of maximum $(5461)^3 \times$(key length/24) is held.

(Exemplification)

Cycle: In this case, a cycle potential in excess of the maximum $(2^{15})^5 \times$(key length/60) is held.

(Exemplification)

Cycle: when $\Delta h1=4111$, $\Delta R1=4099$, $\Delta h2=4127$, $\Delta R2=4129$, $\Delta C1=4139$, $\Delta C2=4153$ and $\Delta L=4133$ are established, cycle is $4099 \times 4111 \times 4127 \times 4129 \times 4133 \times 4139 \times 4153 \times$(key length/56), and with 128-bits $37449 \times 1000 \times 1000$ P (Peta).

At this time, $2M-1-\Delta C1-C10-(\Delta h1-1) \leq h1 \leq 2M-1-\Delta C1-C10$
$57285 \leq h1 \leq 61395$
$8M/7+1 \leq R1 \leq 8M/7+1+(\Delta R1-1)$ $37450 \leq R1 \leq 41548$
$2M-1-\Delta C2-C20-(\Delta h2-1) \leq h2 \leq 2M-1-\Delta C2-C20$
$57255 \leq h2 \leq 61381$
$8M/7+1 \leq R2 \leq 8M/7+1+(\Delta R2-1)$ $37450 \leq R2 \leq 41578$
$C10 \leq C1 \leq C10+(\Delta C1-1)$ $1 \leq C1 \leq 4139$
$C20 \leq C2 \leq C20+(\Delta C2-1)$ $1 \leq C2 \leq 4153$
$M-\Delta L/2 \leq L \leq M+\Delta L/2$ $30701 \leq L \leq 34833$ Primary Mapping Function (Extra Example 1)

Identification: 2 parameter mode, mapping center axis object type

Basic function: $y=ax+b$ (following omitted)

design function: left side function $f(x)=A/Mx+B$ right side function: after conversion for $=2M-x$, same a left side function parameters A[ ], B[ ]

parameter limits $0<B<M<A<2M-B$

Since the degree of divergence of the design function increases as A is larger,

◎ A parameter domain for A occupies $\Delta A$ from close to the maximum value $2M-\Delta B-B0$.

◎ A parameter domain for B occupies A B from close to the minimum value 1.

As a request from a parameter scheduling function,

◎ It is requested that $\Delta A \neq \Delta B$, and that they respectively be prime numbers.

As limit conditions on the design function,

◎ The rule $A>B$ must always be preserved.

if $\Delta h > \Delta R > \Delta C$ is then established, a domain of roughly $\Delta C < \Delta R < \Delta h < M/3$ (=5461) is held.

Cycle potential: in this case, a cycle potential of about maximum $(5461)^3 \times$(key length/29) is held.

(Exemplification)

Cycle: when $\Delta h=4127$, $\Delta R=4111$, and $\Delta C=4099$ are provisionally set, with $4099 \times 4111 \times 4127 \times$(key length/24), a 128-bit key will give a cycle of 341G while a 1024-bit key will give a cycle of 2730G (2.67T).

$2M-1-(\Delta h-1)-(\Delta C-1)-C0 \leq h \leq 2M-1-(\Delta C-1)-C0$
$57310 \leq h \leq 61436$
$M+1 \leq R \leq M+1+(\Delta R-1)$ $32769 \leq R \leq 36879$
$C0 \leq C \leq C0+(\Delta C-1)$ $1 \leq C \leq 4099$ Primary Mapping Function (Extra Example 2)

Identification: 4 parameter mode, mapping central axis symmetrical type, independent left and right function operations basic function: $y=ax+b$ (following omitted)

Primary Mapping Function (Extra Example 3)

Identification: 5 parameter mode, mapping axis variable asymmetric type, independent left and right function operations.

Basic function: $y=ax^2+b$ (following omitted)

And other similar exemplifications are also possible.

Next, a description will be given of a extracting chaotic random number sequence (random number value extraction) to be output from the chaotic noise generating means 103. Here, a value y after equation (18) (no precision correction) and precision correction measures equations (19-A) and (19-B) is a 16-bit chaos signal generated by the integer arithmetic chaos function of this case for every 1 cycle. A method of extracting a 1-bit random number value and extracting an 8-bit random number value under the control of this 16-bit signal will now be described. This process is not simply extraction of 1-bit and 8-bit random number values, but contributes to information concealment with respect to the chaos signal value itself before extraction.

Compared to a process for encrypting plain text information in one bit units (a process of XOR ing with plain text), an the case of extracting a 1-bit random number value and the case of extracting an 8-bit random number value, stream encryption theory enables concealment of a lot of information through related systems, but in the case of a 1-bit random number, eight times as much processing is required as for the 8-bit random number value. For this reason, it is necessary to discuss whether to use the 1-bit unit type or the 8-bit unit type from the point of view of speciality, throughput, degree of randomness, and theoretical information safety. Here, a description will be given for both methods.

1-bit random number value extraction case (First Example)

When value of y for each single cycle<M: random number value=0

When value of y for each single cycle>M: random number value=1 (38)

This is one method.

(Second Example)

When value of y for each single cycle is an even
  number: random number value=0

When value of y for each single cycle is an odd
  number: random number value=1 (39)

This is another method. The two methods will be used in examples.

8-Bit Random Number Extraction Case

The lower 8-bits signal of the y-value (16-bit signal) for each single cycle is made an 8-nit random number value. Considering from an information logic point of view, even if either of the upper 8-bits or the lower 8-bits is missing, 8-bit information still remains unchanged, but considering the situation physically, the fact that the upper 8-bits are missing means that the upper 8-bits of significant value are missing, and means that even general position prediction information is concealed. compared to this, in the event that the lower bits are missing, general position information for the upper 8-bits is given. Therefore, it has been considered valid to cause the upper 8-bits to be intentionally dropped out, and use the lower 8-bits as a random number value. Compared to the above described situation, consideration has also been given to a method of further carrying out table conversion. Table values are preferably different depending on a key value.

Next, encryption processing and decryption processing performed in the Exclusive-OR circuit 105 will be described. As has already been mentioned, encryption is realized by performing XOR processing (exclusive or operation) on 8-bits (1-bit) of plaintext data and a random number string generated as described above to obtain cipher text, and decryption is realized by performing XOR processing (exclusive or operation) on 8-bits (1-bit) of cipher text data and a random number string generated as described above to obtain plain text. Encryption and decryption have a symmetrical structure.

Next, a description will be given of a parameter scheduling function 205 used by scheduling means 104. In theory, the two dimensional geometric generation structure of mapping type chaos is maintained even if expanded in the integer arithmetic range. On the other hand, with an integer arithmetic type, there are problems such as the fact that the width of number values that can be handled is comparatively small, large truncation is carried out, the rate of occurrence of degeneracy is high, and early periodicity appears. With this embodiment, these problems are resolved by periodic change of the parameters, and so that role is provided by the parameter scheduling function (compared to the fact that a chaotic function is called a single stage function, it can be called a two stage function) 205.

The job of the parameter scheduling means 205 is to introduce short term periodicity of the integer arithmetic type chaotic function using variation of parameters for the purpose making the period pseudo long, and compared to a parameter string provided with a key value variation is caused while maintaining the characteristic property (uniqueness) of the key value parameter. Accordingly, because of the role of assisting an integer arithmetic type chaotic function, as simple a structure as possible is achieved. Here, the following methods are considered for variation.

If a parameter range is made seven stages, 0–6, change is as follows:

key value parameter: 1 2 3 4 5 6 7(0) number or repetitions →

1   $2 \rightarrow 3 \rightarrow 4 \rightarrow 5 \rightarrow 6 \rightarrow 0 \rightarrow 1 \rightarrow$ ...
2   $4 \rightarrow 6 \rightarrow 1 \rightarrow 3 \rightarrow 5 \rightarrow 0 \rightarrow 1 \rightarrow$ ...
3   $6 \rightarrow 2 \rightarrow 5 \rightarrow 1 \rightarrow 4 \rightarrow 0 \rightarrow 3 \rightarrow$ ...
4   $1 \rightarrow 5 \rightarrow 2 \rightarrow 6 \rightarrow 3 \rightarrow 0 \rightarrow 3 \rightarrow$ ...
5   $3 \rightarrow 1 \rightarrow 6 \rightarrow 4 \rightarrow 2 \rightarrow 0 \rightarrow 5 \rightarrow$ ...
6   $5 \rightarrow 4 \rightarrow 3 \rightarrow 2 \rightarrow 1 \rightarrow 0 \rightarrow 6 \rightarrow$ ...

In the above, at the sixth iteration, the value becomes 0 no matter what the initial parameter value is started from, which means that a scheme for providing initial phase in advance is devised. Initial phase is therefore changed by key value. Taken together, this is as follows.

///initial processing///

Param_KEY[ ]←key (key value parameter string
  characteristic to the key generated from key
  information) (40)

Param[ ]←initial phase (store initial phase in parameter string) (41)

///thereafter, parameter changes sequentially///

Param[ ]=fmod(Param[ ]+Param_KEY[ ], Param_MAX) (Param_MAX is total number of
  parameter value range) (42)

Next, a design example of the parameter scheduling function will be shown.

Design Example of the Parameter Scheduling Function for Primary Mapping Function In the case of using a chaos function represented in an integer arithmetic type primary mapping function design example, specifically the primary mapping function shown by (5-A) and (5-B), parameter width represented by (14) and (15), and the parameter range represented by (16) and (17), an example of a parameter variation function will be given in the following. Here, parameter numbers are for the case of using two parameters A and B recorded at (14)–(17).

Variable parameter information is:

from (14), $\Delta A=4099$ from (15), $\Delta B=4111$ from (16), $57326 \leq A \leq 61424$ from (17), $1 \leq B \leq 4111$ (43)

$A0=573$ (44)

$B0=1$ (45)

Here, initial phase for key characteristic property parameter strings KEY_A[ ], KEY_B[ ], and parameter strings A[ ], B[ ], are supplied from the key, and if respective array numbers (number of array elements) are made m, the following conditions exist:

///initial processing—each array element determination///

KEY_A[i]←calculation from key value (46)

KEY_B[i] ← calculation from key value  (47)

A[i] ← initial phase (original calculation from key value)  (48)

B[i] ← initial phase (original calculation from key value)  (49)

///parameter scheduling///

$A[i]=A0+fmod(A[i]+KEY\_A[i], \Delta A)$ $(0 \leq i \leq m-1)$  (50)

$B[i]=B0+fmod(B[i]+KEY\_B[i], \Delta B)$ $(0 \leq i \leq m-1)$  (51)

The ranges of key characteristic property parameter strings KEY_A[ ] and KEY_B[ ] are as follows.

$2801 \leq KEY\_A[\ ] \leq 3056$ 256 gradations  (52)

$2801 \leq KEY\_B[\ ] \leq 3056$ 256 gradations  (53)

Design Example of the Parameter Scheduling Function for Secondary Mapping Function In the case of using a chaos function represented in an integer arithmetic type secondary mapping function design example, specifically the primary mapping function shown by (32) and (5-B), parameter width and the parameter range represented by (36) and (37), an example of a parameter variation function will be given in the following. In this example, parameter numbers are for the case of using two parameters h and R recorded at (36) and (37).

Variable parameter information is from (36), $\Delta h=4099$ from (37), $\Delta R=4111$ from (36), $61436 \leq h \leq 65534$ from (37), $57325 \leq R \leq 61435$  (54)

Also, representing respective minimum values for h and R as h0 and R0, $h0=61436$  (55)

$R0=57325$  (56)

The following is the same as for the parameter scheduling function example for the primary function.

Initial phase of key characteristic property parameter strings KEY_h[ ] and KEY_R[ ], and parameter strings h[ ] and R[ ] are given from the key, and if the respective array numbers (number of array elements) is made m, the following are obtained:

///initial process—each array element determination///

KEY_h[i] ← calculation from key value  (57)

KEY_R[i] ← calculation from key value  (58)

h[i] ← initial phase (original calculation of key value)  (59)

R[i]77 initial phase (original calculation of key value)  (60)

///parameter scheduling///

$h[i]=h0+fmod(h[i]+KEY\_h[i], \Delta h)$ $(0 \leq i \leq m-1)$  (61)

$R[i]=R0+fmod(R[i]+KEY\_R[i], \Delta R)$ $(0 \leq i \leq m-1)$  (62)

The ranges of key characteristic property parameter strings KEY_h[ ] and KEY_R[ ] are as follows.

$2801 \leq KEY\_h[\ ] \leq 3056$ 256 gradations  (63)

$2801 \leq KEY\_R[\ ] \leq 3056$ 256 gradations  (64)

Next, a description will be given for conversion from key data design and key data 201 to parameter string 202 and key characteristic property parameter 203 for the case of adopting the integer arithmetic type chaotic function 204 and the parameter scheduling function 205 described above. The present invention in realizing chaotic encryption, adopts a method of causing parameters required in chaotic computation to be changed periodically, and provides key characteristic property parameter 203 and a parameter string (initial phase) 202 based on key data 201. Accordingly, the key data 201 has a close relationship with the adopted parameter scheduling function 205.

Describing a specific example with the already described primary mapping function and parameter scheduling function, the key determines the let characteristic property parameter strings KEY_A[ ] and KEY_B[ ], and the parameter strings A[ ] andB[ ]. That is, the key characteristic property parameter strings KEY_A[ ] and KEY_B[ ] are parameters strings for key characteristic property, and are not changed after being input. On the other hand, the parameter strings A[ ], B[ ] are parameter strings practically contributing to chaotic computation, and are updated as required using the parameter scheduling function 205. Also, as has already been described, the method of updating is to refer to the key characteristic property parameter strings KEY_A[ ], KEY_B[ ] to update as required. ((43)–(53)).

A key design example will be described. A key is structured, assuming provision from a file of key providing means 101, for example, using 1-byte character strings of 16 gradations 'A'–'F' in the key file. In this way, the key characteristic property parameters (KEY_A[ ] and KEY_B[ ]) 203 are obtained using character strings stored inside the key file, but the ranges of KEY_A[ ] and KEY_B[ ] are established from (52) and (53), from (52), $2801 \leq KEY\_A[\ ] \leq 3056$ 256 gradations from (53), $2801 \leq KEY\_B[\ ] \leq 3056$ 256 gradations, and so, from 16 gradations×16 gradations=256 gradations, with two characters stored in the key file, a single array element to be is input to KEY_A[ ], or KEY_B[ ] is determined.

Here 2 parameters A and B have been considered (2 parameter mode). Accordingly, with 4 characters, a single element is determined respectively in KEY_A[ ] and KEY_B[ ]. Also, this corresponds to 16-bit encryption. With 128-bit encryption, from 128(bit)/8(bit/param)/2(param mode)=8, KEY_A[ ] and KEY_B[ ] respectively come to have 8 elements, and 8×2=16 characters are required in the key file. Similarly, with 1024-bit encryption, from 1024(bit)/8(bit/param)/2(param mode)=64, KEY_A[ ] and KEY_B[ ] respectively come to have 64 elements, and 64×2=128 characters are required in the key file.

An example of conversion rules for converting from key data 201 to key characteristic property parameter 203 will now be described. Conversion rules for the key characteristic property parameter strings (KEY_A[ ], KEY_B[ ]) 203 from the characters of the key file can be any kind of rule as long as it is a method determined in advance. For example, conversion rules such as 'AB'→'2901', '9F'→'3041' can be determined.

Next, an example relating to initial phase determination for the parameter strings (A[ ], B[ ]) 202 will be described. As well as providing the key parameter characteristic property parameter strings (KEY_A[ ], KEY_B[ ]) 203, the key data 201 also provides initial phase of the parameter strings (A[ ], B[ ]) updated as required using the parameter scheduling function 205. In particular, with this structural example, chaos is utilized regardless of whether or not A[ ]=KEY_A[ ] and B[ ]=KEY_B[ ] are given.

When utilizing chaos, after determining KEY_A[ ], KEY_B[ ] from the key using a method already described in the key design example, first A[ ]=KEY_A[ ] and B[ ]=KEY_B[ ] are substituted, and in this state chaos is computed as normal. If the number of iterations in this chaos computation is made z, a method is adopted using a chaotic random number value of 2×m (from the z−(2×m)+1th iteration to the zth iteration) from the final z iteration as an initial parameter for A[ ] and B[ ]. If it is taken into consideration that this can also serve as "initial approach period of function", which will be described later, it is possible to efficiently generate a random initial phase.

During the course of the above described initial phase determination, it is not particularly necessary to perform parameter scheduling. Also, a value for the number of iterations z is preferable as large as possible, but from experience, in the case of n-bit encryption about n/8–n/2 is appropriate.

Description of "initial approach period of chaos function". Once all initial information (key characteristic property parameter string 203 and parameter 202 (initial phase)) has been supplied, a core section function enters a normal operating state and computation of a chaotic pseudo random number using the method of the present invention becomes possible, but here, because of key information divergence a pseudo random number generated at the initial iteration of the z iterations is truncated, and a pseudo random number string obtained through iterations after the zth iteration is made valid. The value of z is preferably as large as possible, but as stated before, from experience in the case of n-bit encryption n/8–n/2 is appropriate. In this example, this value is calculation of a number of iterations until adjacent neighborhoods diverge over the entire mapping range due to sensitivity to initial conditions. Also, in relation to initial phase determination for the parameter strings (KEY A[ ], KEY_B[ ]) in the chaos of utilizing chaos described in a latter section, during the course of that operation process a function initial approach is also performed.

Figure 17:
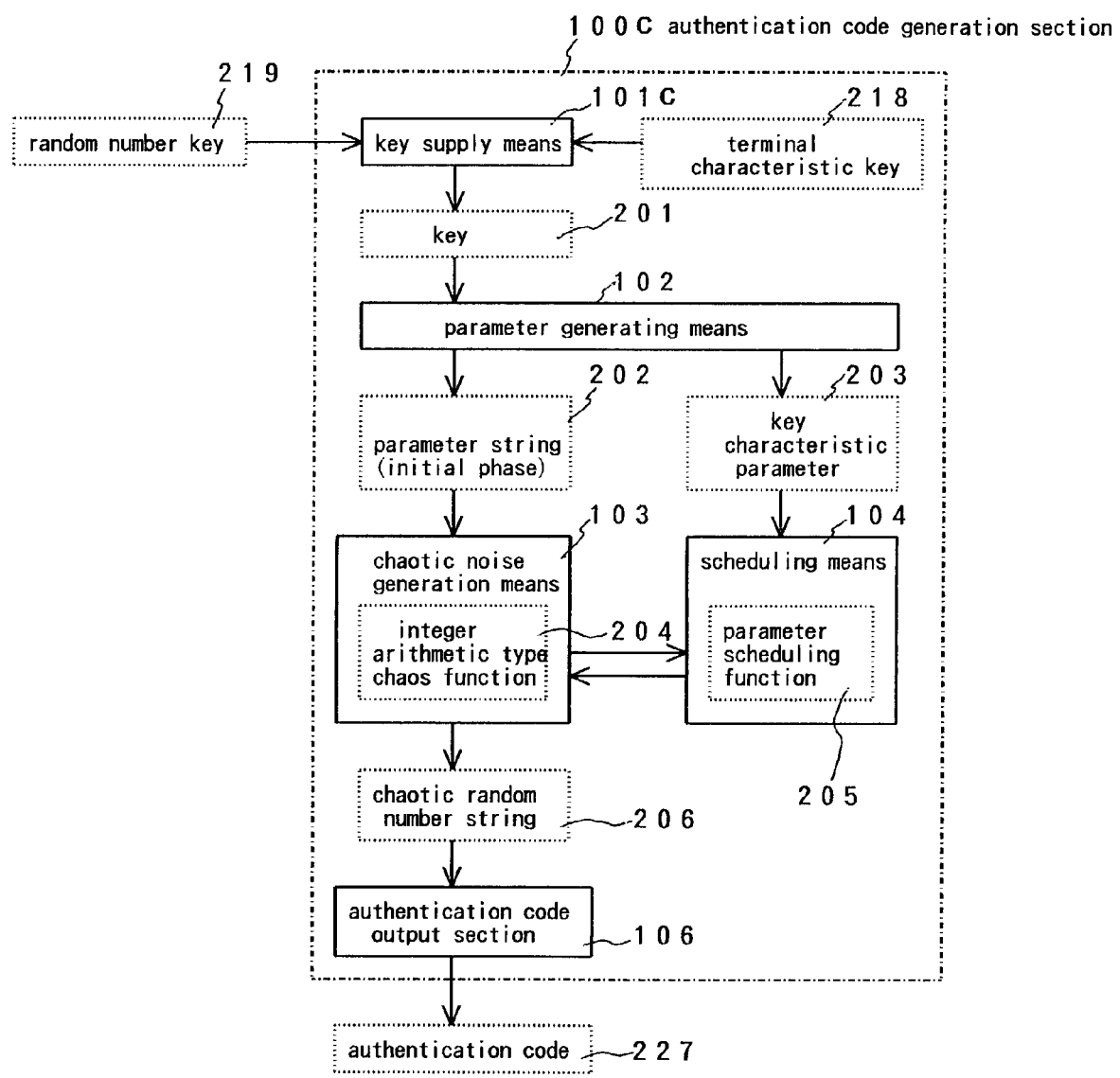
FIG. 17 is a drawing showing the structure of essential sections of an authentication system of the present invention.

In FIG. 17, the structure of an authentication code generation section 100C, being an essential part of an authentication system of the present invention, is shown. The authentication code generation section 100C has the same basic construction as the cipher generation device 100A and the cipher decoding device 100B shown in FIG. 1. Specifically, parameter generation means 102, chaotic noise generation means 103 and scheduling means 104 are provided.

Also, as a characteristic to the structure of the authentication code generation section 100C, key supply means 101C and authentication code output section 106 are provided. The key supply means 101C outputs key data 201 that is a combination of terminal characteristic key data 218 and random number key data 219.

In this structure, the data combination is produced by adopting a method that makes the terminal characteristic key data 218 the upper bits (or lower bits) and makes the random number key data the lower bits (or upper bits), or a method that is a combination of these.

Using the above described key data 201, processing performed by the parameter generation means 102, chaotic noise generation means 103 and scheduling means 104 is the same as the operation of the cipher generating device 100A and the cipher decoding device 100B, and a chaotic random number sequence 206 is obtained from the chaotic noise generation means 103. The authentication code output section 106 outputs the chaotic random number string 206 as an authentication code 227.

In the above, when the authentication code generating section 100C is applied to a client provided in a network, the terminal characteristic key data 218 is set in advance as characteristic information of the device itself, while the random number key data 219 are sent from a server each time authentication is carried out. On the other hand, when the authentication code generating section 100C is applied to a server provided in a network, the terminal characteristic key data 218 is stored in advance as data assigned to a specified client, while the random number key data 219 are data transmitted each time authentication is carried out, in response to a request from a client.

Figure 18:
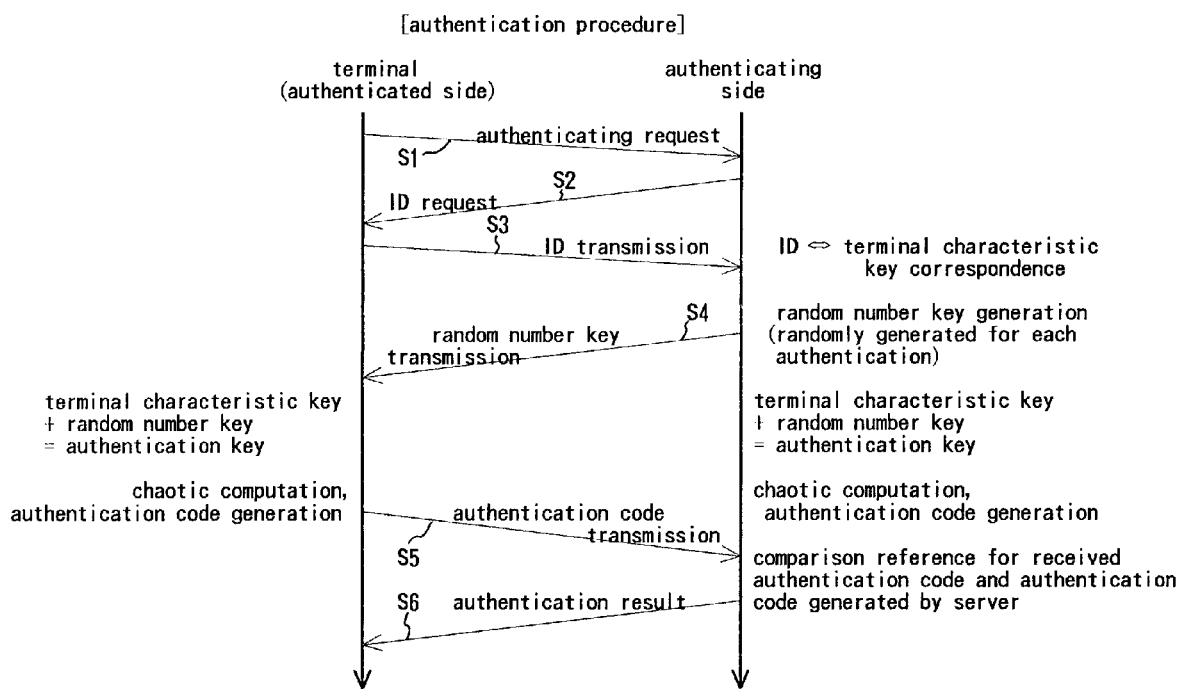
FIG. 18 is a drawing showing the operating sequence of an authentication system of the present invention.

An authentication procedure carried out by the client (terminal (authenticated side)) and the server (authenticating side) included in the above described system is shown in FIG. 18, and will now be described. The terminal send an authentication request to the authenticating side (S1). At the authenticating side receiving this request, an ID request is returned (S2), and in response to the request ID the terminal sends its own ID (S3). The authenticating side receives this ID, and based on that ID allows specification of a terminal characteristic key corresponding to that terminal.

The authentication side generates a random number key and transmits that key to the terminal (S4). The terminal performs computes chaos computation to obtain the terminal characteristic key of its own device and a random number key as an authentication key, generates an authentication code and transmits the authentication code to the authenticating side (S5). At the authenticating side, the terminal characteristic key corresponding to the ID response the random number key transmitted to its own terminal are subjected to chaotic computation as an authentication key, an authentication code is generated, this authentication code and the authentication code transmitted from the terminal are compared, and a comparison result (authentication OK if they match, authentication NG if they do not match) is transmitted to the terminal (S6).

The authentication code generating section 100C described here, as well as the cipher generating device 100A and the cipher decoding device 100B described in FIG. 1 are all built into a single electronic device. This electronic device is, for example, any of various types of computer such as a personal computer or workstation, a portable terminal such as a portable telephone, an IC card, a consumer electronic information device, etc.

Figure 19:
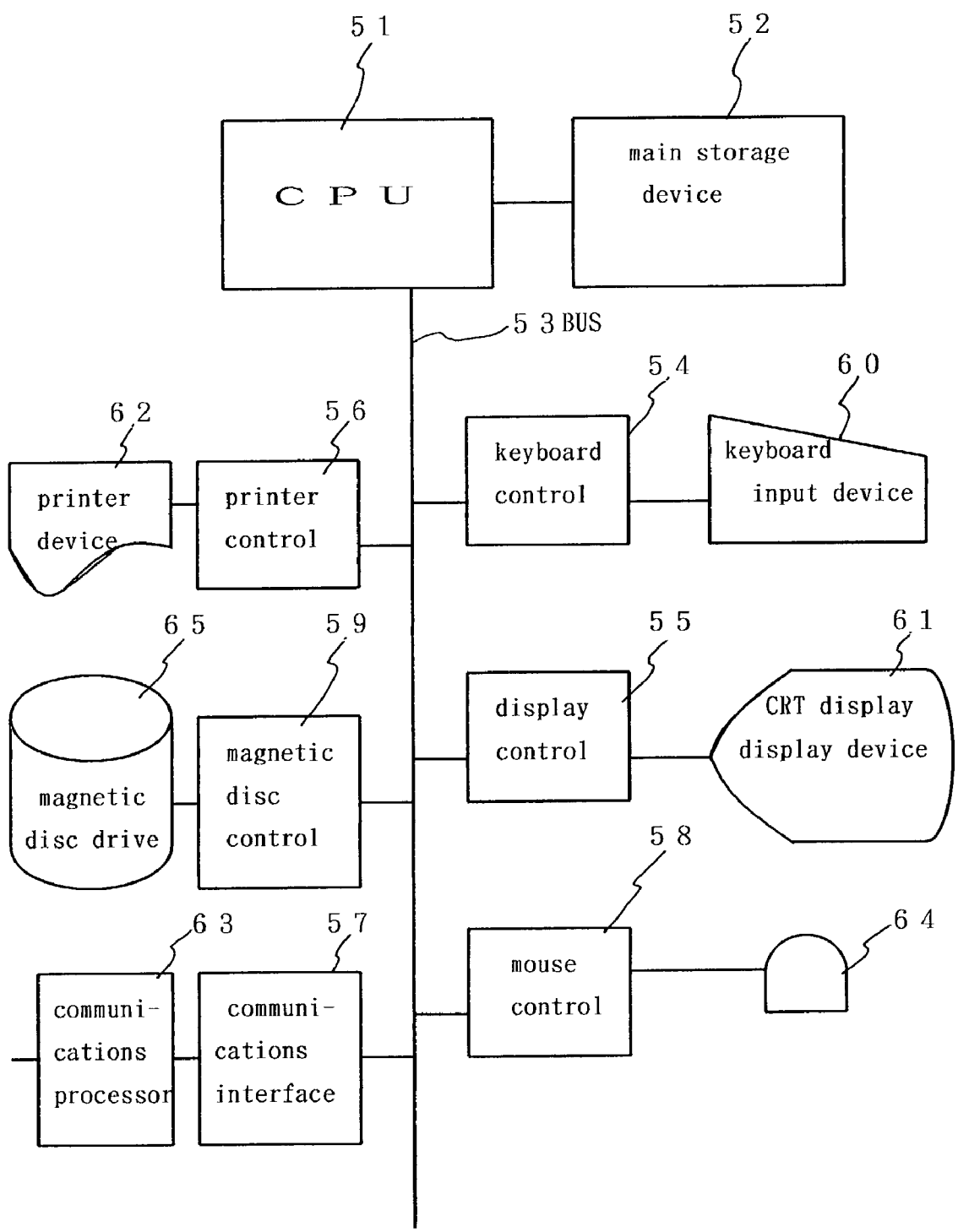
FIG. 19 is a structural drawing of an electronic device to which a cipher generation, cipher decoding and authentication code creation program of the present application are applied.
Figure 20:
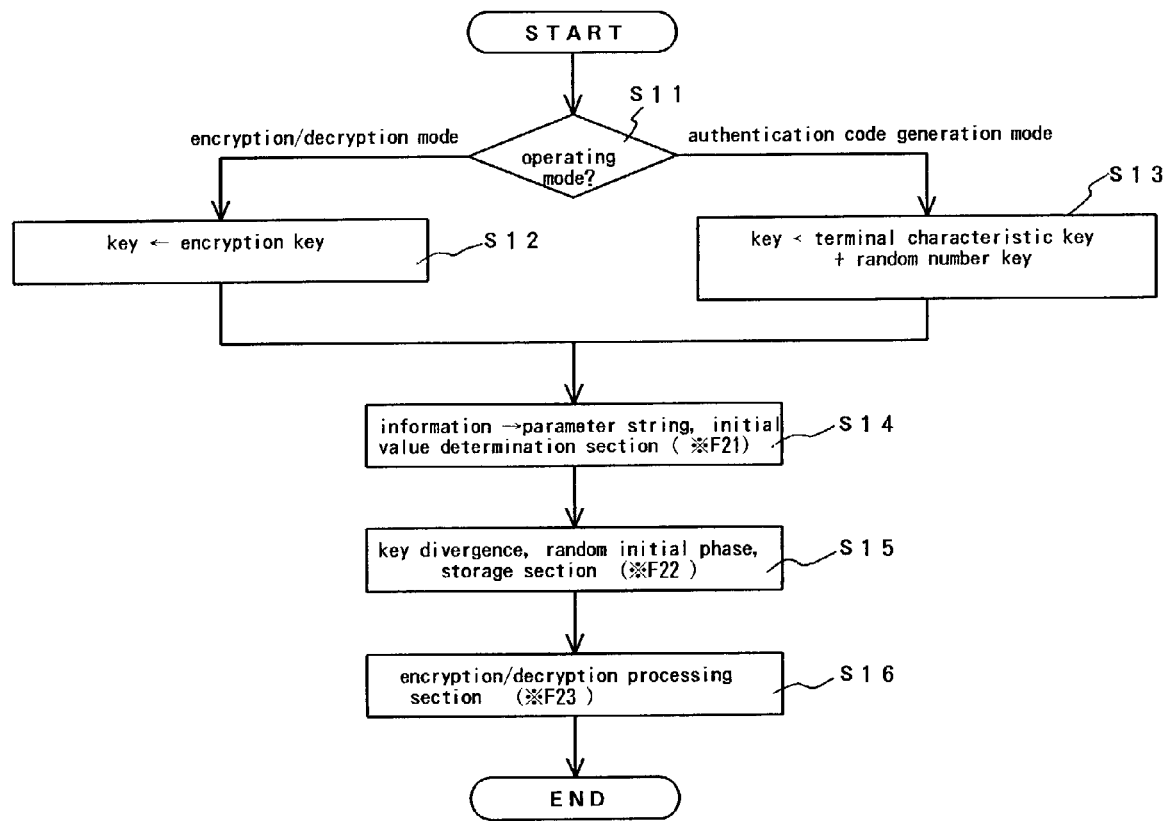
FIG. 20 is a flow chart for describing operation with the cipher generation, cipher decoding and authentication code creation program of the present application.

The structure of computer such as a personal computer or a workstation exemplifying such an electronic device is shown in FIG. 19. This computer has a CPU 51 for overall control of the device, and a main storage device 52 for storing information such as programs and data used by the CPU 51 is connected to the CPU 51. A keyboard control section 54, a display control section 55, a printer control section 56, a communications interface 57, a mouse control section 58 and a magnetic disk control section 59 are also connected to the CPU 51 via a system bus. A keyboard input device 60 capable of key input of various information is connected to the keyboard control section 54, a CRT display device 61 for displaying information is connected to the display control device 55, a printer 62 for producing hard copy of information is connected to the printer control section 56, a communications processor 63 for carrying out communication with a server via a line circuit is connected to the communications interface 57, a mouse 64 is connected, being a pointing device, is connected to the mouse control section 58, and a magnetic disc drive 56, being an auxiliary storage device, is connected to the magnetic disc control section 59. At least a CPU 51, main storage device 52, magnetic disc control section 59, magnetic disc drive 65, communications interface 57 and communications control section 63 are provided in a server connected via a network. Also, as required, a floppy disk drive, magnetic card or IC card reader, MO (magneto-optical disk) drive etc. are provided in the computer.

Programs for the flowcharts shown in FIG. 20–FIG. 23 are stored in the magnetic disc of the computer, loaded into the main memory at the time of activation and executed, to realize the cipher generating device 100A and cipher decoding device shown in FIG. 1 and the authentication code generating section shown in FIG. 17 Operation will now be described using these flowcharts.

The flowchart of FIG. 10 shows an outline of the overall processing. If the program following this flowchart is launched, the operating mode is detected, to determine whether to perform encryption/decryption mode or authentication code generation mode (S11). Here, if the encryption/decryption mode is detected, an encryption key is read from a file, as described previously, to load key data (S12). If the authentication code generation mode is detected, the sequence shown in FIG. 18 is executed, and a random number key is obtained and combined with a terminal characteristic key to load key data (S13).

Figure 21:
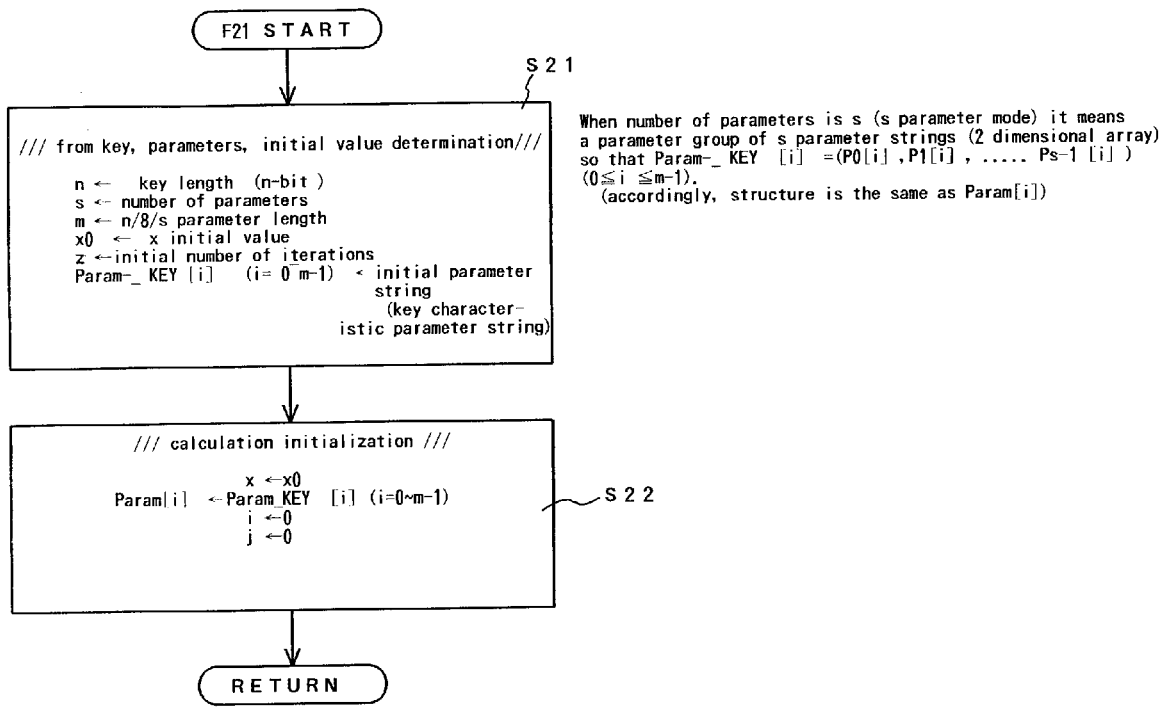
FIG. 21 is a flow chart for describing operation with the cipher generation, cipher decoding and authentication code creation program of the present application.
Figure 22:
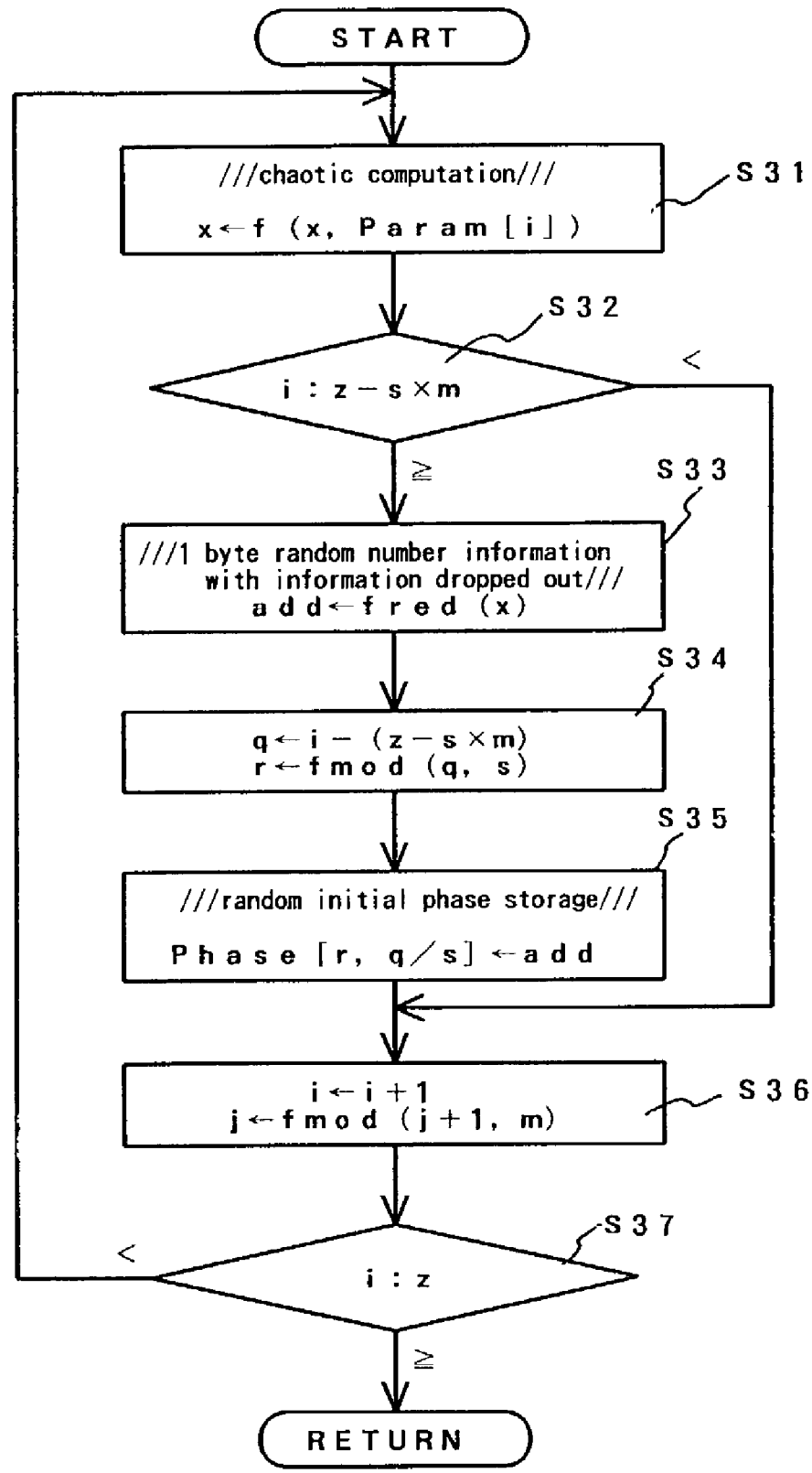
FIG. 22 is a flow chart for describing operation with the cipher generation, cipher decoding and authentication code creation program of the present application.
Figure 23:
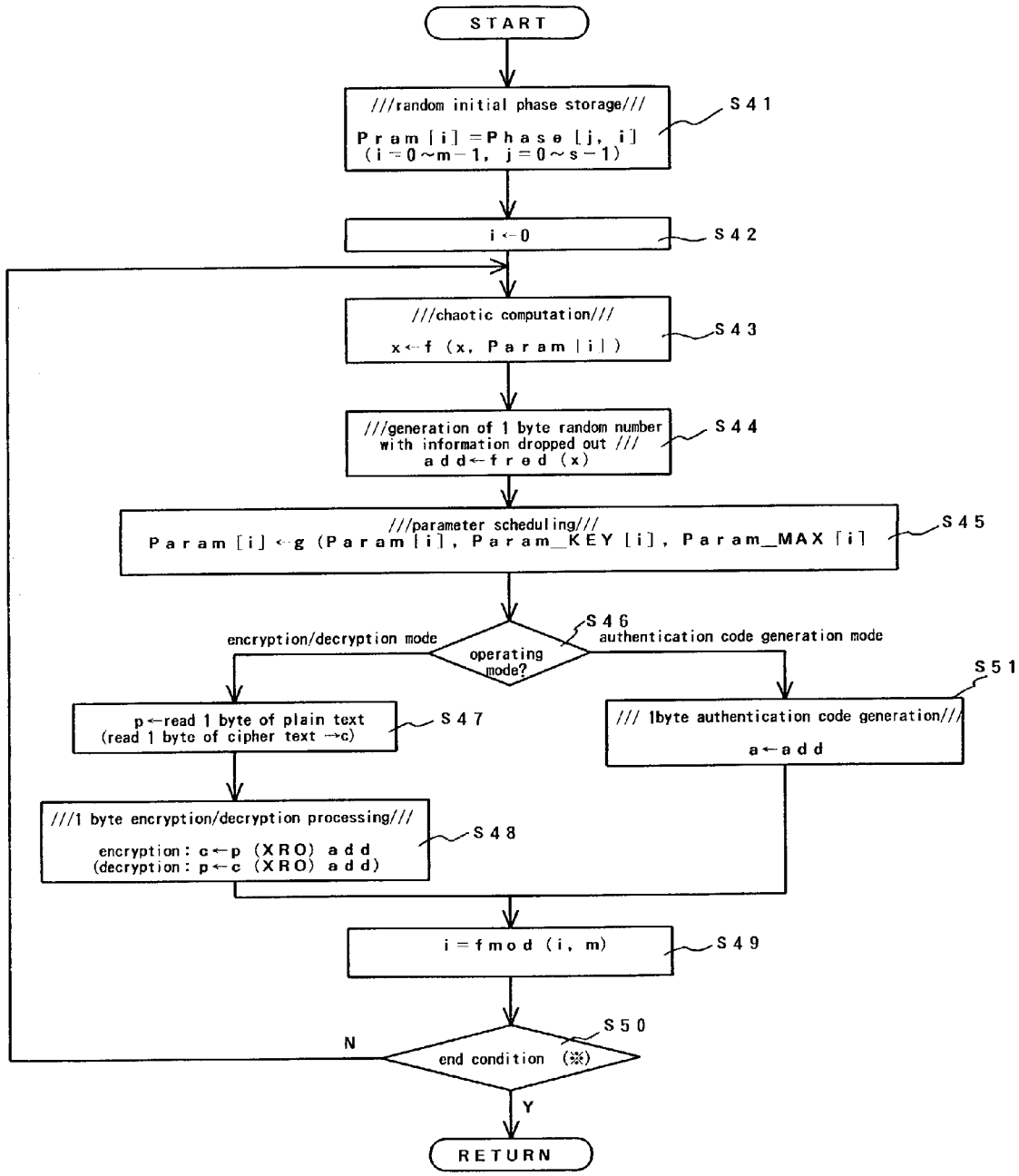
FIG. 23 is a flow chart for describing operation with the cipher generation, cipher decoding and authentication code creation program of the present application.

Once key data is acquired through step S12 and step S13 described above, processing to acquire a key characteristic parameter 203 and also to determined initial values is executed (S14) to realize the function of the parameter generating means 102, and then processing for generating and storing random initial phase (parameter string) together with key divergence is executed (S15). Based on this random initial phase, the chaotic noise generation section 103 carried out encryption/decryption or authentication code generation. At the time of this encryption/decryption or authentication code generation, the scheduling means 104 carries out parameter scheduling using a scheduling function. The details of the above described routine S14 are shown in the flowchart of FIG. 21, the details of the routine S15 are shown in the flowchart of FIG. 22, and the details of the routine S16 are shown in the flowchart of FIG. 23.

The details of routine S14 will now be described. Based on the key data 201, key length, number of parameters, parameter length, x initial value, and initial number of iterations are respectively set to n, s, m, x0 and z, and a key characteristic parameter string is obtained using a predetermined rule (such as a table), and loaded into Param_KEY[i](i=0~m−1) (S21). Here, Param_KEY[i] means a group of s parameter strings (a two-dimensional array), such that when the number of parameters is s, P0[i], P1[i], . . . , Ps−1[i](0≦i≦m−1). This also applies to Param[i] entered at S22. In subsequent processing, x0 is loaded into x, Param_KEY[i](i=0~m−1) is loaded into Param[i] and 0 is loaded into i and j (S22).

Next, the details of routine S15 will be described. First of all, chaos computation is performed using the above described Param[i] (S31). Normal verification of the i value is carried out so that z iterations are carried out (S32), and if it is normal a 1 byte random number having chaotic noise information dropped out is set to add (S33). Then, as shown in the drawing, the values of q and r are converted (S34), and for random initial phase Phase[r, q/s] the 1 byte random number with information dropped out and that has been set to add is set and stored (S35).

Next, as shown in the drawing, i and j are updated (S36), normal verification of the i value is carried out so that z iterations are carried out (S37), and if z iteration have been completed, restoration is performed. In this way, in the relevant processing, integer arithmetic type chaos function the same as the encryption section is used, an initial approach period is performed z times, key value divergence is carried out, and a chaotic random number obtained by means of the z approaches is used as initial phase. in the chaotic noise generation using the integer arithmetic type, parameter scheduling is not carried out.

The details of routine S16 will now be described. First of all, storage of random phase in Param[i] is carried out (S41) and i is reset (S42) in preparation for the next chaotic computation. Chaotic computation is then carried out, and chaotic noise is obtained (S43). Next, a 1 byte random number with chaotic noise information dropped out is set to add (S44). Parameter scheduling is then carried out (S45). The operating mode is then detected (S46), and it is determined whether to perform encryption/decryption mode or authentication code generation mode. If it is detected that the operating mode is encryption/decryption mode, then in the case of encryption 1 byte of plain text (in the case of decryption, 1 byte of cipher text) is read out (S47), encryption or decryption is carried out by excusive OR operation with 1 byte of random number data having information dropped out that has been set to add (S48), i is updated (S49), detection of an end condition (·X·) indicating that processing of the entire plan text (or cipher text) has completed is carried out (S50), and processing returns to step S43).

If it is detected in step S46 that the operating node in authentication code generation mode, the 1 byte random number with information dropped out that has been set to add is made the authentication code (S51). i is then update (S49), the end condition (·X·) is detected (S50), and processing returns to step S43. The end condition (·X·) of this authentication code generation mode is reaching a predetermined data length of the authentication code.

With this structure, it is possible to have an encryption/decryption function and a terminal authentication function. For example, it is applicable to an IC card for E-commerce. In this case, the authentication function of the present invention specifies a correct owner from individual identification of the IC card, settlement is prompted to appropriate banking facilities, and functions of encrypted storage of individual confidential information or encrypted storage of a communication path is implemented, and these "authentication" and "encryption" can be implemented simply in a program. Thus, with installation of the present invention, it is possible to aim at simplification and weight reduction of the overall system.

Also, as with cooperation between systems for delivering content (game software, music, images) to the next generation of game machines, information devices etc., and purchasing systems, it is possible to carry out security administration by specifying a user from the terminal identification, and it is possible to resolve security issues involved with encrypted content delivery etc for the purpose of copyright protection.

According to the present invention as described above, a parameter string used in chaotic computation is generated based on key data, chaotic computation is performed using the generated parameter string to obtain chaotic noise, and at the same time scheduling of the parameter string is carried out so as to cause change in the parameter string for every specified cycle in the chaotic computation using the parameter string, which means that it becomes possible to effectively move around the chaotic parameter domain, and an effect is realized of carrying out encryption that has sufficient concealment in the chaotic computation using integer arithmetic and bit arithmetic. Further, with substantial collaboration between the encryption and decryption processing, appropriate authentication is performed.

What is claimed is:

1. A cipher generating device for generating a cipher by carrying out computation to apply chaotic noise obtained using a mapping function for generating chaotic noise based on encrypted key data to plain text information, comprising:
  parameter generation means for generating a parameter string for use in chaotic computation based on the key data;
  chaotic noise generating means for carrying out chaotic computation using the parameter string generated by the parameter generating means and obtaining the chaotic noise;
  encryption means for encrypting the plain text information using the generated chaotic noise; and
  scheduling means for carrying out scheduling of the parameter string so as to cause a change in the parameter string every fixed cycle the parameter string is used in the chaotic computation;
  wherein the scheduling means comprises:
    a generating means for generating key characteristic parameters based on the key data, the key characteristic parameters being integers,
    a parameter obtaining means for obtaining a predetermined number of integers from a predefined sequence, and
    a key characteristic modification means for changing the key characteristic parameters based on the predetermined number of integers, in a parameter scheduling function; and
  wherein the parameter generation means is implemented as instructions on a computer-readable storage medium.

2. The cipher generating device of claim 1, further comprising initial phase determination means for determining initial phase, being the order for providing the parameter string to the chaotic noise generating means.

3. A cipher decoding device, for decoding cipher text, generated using a cipher generating device for carrying out computation, on plain text information, to apply chaotic noise obtained using a mapping function for generating chaotic noise based on encryption key data, to generate a cipher, and comprising parameter generation means for generating a parameter string for use in chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation, to return the cipher text to original text, comprising:
  parameter generating means for generating a parameter string using chaotic computation based on the key data;
  chaotic noise generating means for carrying out chaotic computation using the parameter string generated by the parameter generating means and obtaining the chaotic noise;
  decryption means for decrypting the cipher text using the generated chaotic noise; and
  scheduling means for carrying out scheduling of the parameter string so as to cause a change in the parameter string every fixed cycle parameter string is used in the chaotic computation;
  wherein the scheduling means comprises:
    a generating means for generating key characteristic parameters based on the key data, the key characteristic parameters being integers,
    a parameter obtaining means for obtaining a predetermined number of integers from a predefined sequence, and
    a key characteristic modification means for changing the key characteristic parameters based on the predetermined number of integers, in a parameter scheduling function; and
  wherein the parameter generation means is implemented as instructions on a computer-readable storage medium.

4. The cipher decoding device of claim 3, further comprising initial phase determination means for determining initial phase, being the order for providing the parameter string to the chaotic noise generating means.

5. A cipher generating method, for carrying out computation, for plain text information, to apply chaotic noise obtained using a mapping function for generating chaotic noise based on encrypted key data, to generate a cipher, comprising:
  a parameter generating step for generating a parameter string for use in chaotic computation based on the key data;
  a chaotic noise generating step for carrying out chaotic computation using the parameter string generated in the parameter generating step and obtaining the chaotic noise;
  an encryption step for encrypting the plain text information using the generated chaotic noise; and
  a scheduling step for carrying out scheduling of the parameter string so as to cause a change in the parameter string every fixed cycle the parameter string is used in the chaotic computation;
  wherein the scheduling step comprises:
    a generating step for generating key characteristic parameters based on the key data, the key characteristic parameters being integers,
    a parameter obtaining step for obtaining a predetermined number of integers from a predefined sequence, and
    a key characteristic modification step for changing the key characteristic parameters based on the predetermined number of integers, in a parameter scheduling function.

6. A cipher decoding method, used in a cipher decoding device for decoding cipher text, generated using a cipher generating device for carrying out computation, for plain text information, to apply chaotic noise obtained using a mapping function for generating chaotic noise based on encryption key data, to generate a cipher, and comprising parameter generation means for generating a parameter string for use in chaotic computation based on the key data, chaotic noise generating means for carrying out chaotic computation using the parameter string generated by the parameter generating means and obtaining the chaotic noise, and scheduling means for carrying out scheduling of the parameter string so as to cause a change in the parameter string every fixed cycle the parameter string is used in the chaotic computation, to return the cipher text to original text, wherein the scheduling means comprises:
- a generating means for generating key characteristic parameters based on the key data, the key characteristic parameters being integers,
- a parameter obtaining means for obtaining a predetermined number of integers from a predefined sequence, and
- a key characteristic modification means for changing the key characteristic parameters based on predetermined number of integers, in a parameter scheduling function;

the method comprising:
- a parameter generating step for generating a parameter string for use in chaotic computation based on the key data;
- a chaotic noise generating step for carrying out chaotic computation using the parameter string generated in the parameter generating step and obtaining the chaotic noise;
- a decryption step for decrypting the cipher text using the generated chaotic noise; and
- a scheduling step for carrying out scheduling of the parameter string so as to cause a change in the parameter string every fixed parameter string is used in the chaotic computation;

wherein the scheduling step comprises:
- a generating step for generating key characteristic parameters based on the key data, the key characteristic parameters being integers,
- a parameter obtaining step for obtaining a predetermined number of integers from a predefined sequence, and
- a key characteristic modification step for changing the key characteristic parameters based on the predetermined number of integers, in a parameter scheduling function.

7. An authentication system, comprising an authentication device for performing authentication and an authentication request device for requesting authorization to the authorization device, wherein:

the authentication request device is provided with:
- parameter generation means for generating a parameter string for use in chaotic computation based on key data transmitted from the authentication device and key data possessed by the authentication request device,
- chaotic noise generating means for carrying out chaotic computation using the parameter string generated by the parameter generating means and obtaining the chaotic noise,
- scheduling means for carrying out scheduling of the parameter string so as to cause a change in the parameter string every fixed cycle the parameter string is used in the noise computation, and
- transmitting means for returning chaotic noise generated by the chaotic noise generating means to the authentication device as authentication code information; and the authentication device is provided with:
- parameter generation means for generating a parameter string for use in chaotic computation based on the key data transmitted from the authentication device and key data possessed by the authentication request device,
- chaotic noise generating means for carrying out chaotic computation using the parameter string generated by the parameter generating means and obtaining the chaotic noise,
- scheduling means for carrying out scheduling of the parameter string so as to cause a change in the parameter string every fixed cycle the parameter string is used in the noise computation, and
- comparison means for comparing chaotic noise generated by the chaotic noise generating means with the authentication code information returned from the authentication request device to obtain an authentication result;

wherein the scheduling means of the authentication device and the authentication request device comprises:
- a generating means for generating key characteristic parameters based on the key data, the key characteristic parameters being integers,
- a parameter obtaining means for obtaining a predetermined number of integers from a predefined sequence, and
- a key characteristic modification means for changing the key characteristic parameters based on the predetermined number of integers, in a parameter scheduling function.

8. An electronic device, for requesting authentication to an authentication device for performing authentication, comprising:
- parameter generation means for generating a parameter string for use in chaotic computation based on key data transmitted from the authentication device and key data possessed by the authentication request device;
- chaotic noise generating means for carrying out chaotic computation using the parameter string generated by the parameter generating means and obtaining the chaotic noise; and
- scheduling means for carrying out scheduling of the parameter string so as to cause a change in the parameter string every fixed cycle the parameter string is used in the chaotic computation, wherein chaotic noise generated by the chaotic noise generating means is returned to the authentication device as authentication code information;

wherein the scheduling means comprises:
- a generating means for generating key characteristic parameters based on the key data, the key characteristic parameters being integers,
- a parameter obtaining means for obtaining a predetermined number of integers from a predefined sequence, and
- a key characteristic modification means for changing the key characteristic parameters based on the predetermined number of integers, in a parameter scheduling function.

* * * * *